US012658574B2

(12) United States Patent
Chisum et al.

(10) Patent No.: US 12,658,574 B2
(45) Date of Patent: Jun. 16, 2026

(54) SPARSE PHASED-ARRAY-FED FOCUSING APERTURE ANTENNAS WITH REDUCED GRATING LOBES

(71) Applicant: University of Notre Dame du Lac, South Bend, IN (US)

(72) Inventors: Jonathan Chisum, South Bend, IN (US); Nicolas Garcia, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 204 days.

(21) Appl. No.: 18/476,517

(22) Filed: Sep. 28, 2023

(65) Prior Publication Data

US 2025/0030158 A1 Jan. 23, 2025

Related U.S. Application Data

(62) Division of application No. 17/725,547, filed on Apr. 21, 2022.

(60) Provisional application No. 63/283,817, filed on Nov. 29, 2021, provisional application No. 63/177,332, filed on Apr. 20, 2021.

(51) Int. Cl.
*H01Q 19/06* (2006.01)
*H01Q 3/26* (2006.01)
*H01Q 19/17* (2006.01)

(52) U.S. Cl.
CPC ......... *H01Q 3/2658* (2013.01); *H01Q 19/062* (2013.01); *H01Q 19/17* (2013.01)

(58) Field of Classification Search
None
See application file for complete search history.

(56) References Cited

U.S. PATENT DOCUMENTS

| | | | | |
|---|---|---|---|---|
| 3,755,815 | A | 8/1973 | Stangel | |
| 10,193,240 | B2 | 1/2019 | Buer | |
| 2012/0274525 | A1 | 11/2012 | Lam | |
| 2017/0141464 | A1 | 5/2017 | Driscoll | |
| 2017/0222327 | A1* | 8/2017 | Retter | H01Q 3/2658 |
| 2018/0115083 | A1 | 4/2018 | Besoli | |
| 2018/0316090 | A1 | 11/2018 | Foo | |

(Continued)

OTHER PUBLICATIONS

Non-final Office Action from U.S. Appl. No. 17/725,547, dated May 20, 2025, 12 pp.

(Continued)

*Primary Examiner* — Idowu O Osifade
(74) *Attorney, Agent, or Firm* — Greenberg Traurig, LLP

(57) ABSTRACT

An apparatus includes a plurality of antenna feed elements arranged in an array and a reflector or lens. The reflector or lens is configured to focus a first signal generated by the plurality of antenna feed elements or focus a second signal not generated by the plurality of antenna feed elements onto the plurality of antenna feed elements. The apparatus further includes a controller or processor configured to control the plurality of antenna feed elements to generate the first signal or receive the second signal. The first signal and the second signal have a nominal wavelength. The plurality of antenna feed elements are spaced from one another in the array at a distance greater than half of the nominal wavelength.

23 Claims, 25 Drawing Sheets

(56) References Cited

U.S. PATENT DOCUMENTS

| | | | |
|---|---|---|---|
| 2020/0091622 | A1 | 3/2020 | Turpin |
| 2021/0376461 | A1 | 12/2021 | Dallal |

OTHER PUBLICATIONS

Aljuhani et al., "A 256-Element Ku-Band Polarization Agile SATCOM Transmit Phased Array With Wide-Scan Angles, Low Cross Polarization, Deep Nulls, and 36.5-dBW EIRP per Polarization," IEEE Trans. Microw. Theory Techn., vol. 69, pp. 2594-2608, May 2021.

Aljuhani et al., "A Scalable Dual-Polarized 256-Element Ku-Band Phased-Array SATCOM Receiver with ±70° Beam Scanning," in 2018 IEEE/MTT-S Int.l Microw. Symp.—IMS, pp. 1203-1206, Jun. 2018. ISSN: 2576-7216.

Artemenko et al., "Multiple-feed integrated lens antenna with continuous scanning range," in 2017 11th European Conf. Antennas Propag. (EUCAP), pp. 2795-2799, Mar. 2017.

Blank et al., "Array feed synthesis for correction of reflector distortion and vernier beamsteering," IEEE Trans. Antennas Propag., vol. 36, p. 1351-1358, Oct. 1988.

Chen et al., "Metantennas: Flat Luneburg Lens Antennas Using Transformation Optics Method (TOM)," in 2020 Intl. Workshop Antenna Techn. (iWAT), pp. 1-3, Feb. 2020.

Cooley, "Phased array fed reflector (pafr) antenna architectures for space-based sensors," in 2015 IEEE Aerospace Conference, pp. 1-11, 2015.

Dubok et al., "Reflector synthesis for wide-scanning focal plane arrays," IEEE Trans. Antennas Propag., vol. 67, No. 4, pp. 2305-2319, 2019.

Erfani et al., "A High-Gain Broadband Gradient Refractive Index Metasurface Lens Antenna," IEEE Trans. Antennas Propag., vol. 64, pp. 1968-1973, May 2016.

Feng et al., "Ku-Band Transmitarrays With Improved Feed Mechanism," IEEE Trans. Antennas Propag., vol. 66, pp. 2883-2891, Jun. 2018.

Fonseca et al., "Hybrid array fed reflector antenna solution for broadband satellite communications," in 2017 11th European Conf. Antennas Propag. (EUCAP), pp. 2645-2648, 2017.

Gao et al., "A 22-44-GHz Phased-Array Receive Beamformer in 45-nm CMOS SOI for 5G Applications With 3-3.6-dB NF," IEEE Trans. Microw. Theory Techn., pp. 1-10, 2020.

Garcia et al., "Feed corrective lenslets for enhanced beamscan in flat lens antenna systems," Optics Express, vol. XX, No. xx, pp. 1-2, 2022. Publisher: Optical Society of America (Under Review).

Garcia et al., "High-Efficiency, Wideband GRIN Lenses With Intrinsically Matched Unit Cells," IEEE Trans. Antennas Propag., vol. 68, pp. 5965-5977, Aug. 2020.

Garcia et al., "Reduced dimensionality optimizer for efficient design of wideband millimeter-wave 3D metamaterial GRIN lenses," Microw. Opt. Techn. Lett., vol. 63, No. 5, pp. 1372-1376, 2021.

Giordani et al., "Initial Access in 5G mmWave Cellular Networks," IEEE Commun. Mag., vol. 54, pp. 40-47, Nov. 2016.

Gultepe et al., "A 256-Element Dual-Beam Polarization—Agile SATCOM Ku-Band Phased-Array With 5-dB/K G/T," IEEE Trans. Microw. Theory Techn., pp. 1-1, 2021.

He et al., "Matched, Low-Loss, and Wideband Graded-Index Flat Lenses for Millimeter-Wave Applications," IEEE Trans. Antennas Propag., vol. 66, pp. 1114-1123, Mar. 2018.

Hindle, "Comprehensive survey of commercial mmwave phased array companies," Microwave Journal, Jan. 2020 [Online] www.microwavejournal.com/articles/33357-comprehensive-survey-ofcommercial- mmwave-phased-array-companies.

Imbert et al., "Design and Performance Evaluation of a Dielectric Flat Lens Antenna for Millimeter-Wave Applications," IEEE Antennas Wireless Propag. Lett., vol. 14, pp. 342-345, 2015.

Kibaroglu et al., "A 64-Element 28-GHz Phased-Array Transceiver With 52-dBm EIRP and 8-12-Gb/s 5G Link at 300 Meters Without Any Calibration," IEEE Trans. Microw. Theory Techn., vol. 66, pp. 5796-5811, Dec. 2018.

Leeper, "Isophoric arrays-massively thinned phased arrays with well-controlled sidelobes," IEEE Trans. Antennas Propag., vol. 47, pp. 1825-1835, Dec. 1999.

Li et al. "Multibeam 3-D-Printed Luneburg Lens Fed by Magnetoelectric Dipole Antennas for Millimeter-Wave MIMO Applications," IEEE Trans. Antennas and Propag., vol. 67, pp. 2923-2933, May 2019.

Lo et al., "A study of space-tapered arrays," IEEE Trans. Antennas Propag., vol. 14, No. 1, pp. 22-30, 1966.

Luneburg et al., "Mathematical Theory of Optics," Physics Today, vol. 18, p. 63, 1965.

Luo et al., "A Scalable Ka-Band 1024-Element Transmit Dual-Circularly-Polarized Planar Phased Array for SATCOM Application," IEEE Access, vol. 8, pp. 156084-156095, 2020.

Mailloux, Phased Array Antenna Handbook, Third Edition. Artech House, 2017, 3 pp.

Mateo-Segura et al., "Flat luneburg lens via transformation optics for directive antenna applications," IEEE Trans. Antennas Propag., vol. 62, pp. 1945-1953, Apr. 2014.

Nafe et al., "2x 64-Element Dual-Polarized Dual-Beam Single-Aperture 28-GHz Phased Array With 2x 30 Gb/s Links for 5G Polarization MIMO," IEEE Trans. Microw. Theory Techn., pp. 1-1, 2020.

Nguyen et al., "Focal Array Fed Dielectric Lenses: An Attractive Solution for Beam Reconfiguration at Millimeter Waves," IEEE Trans. Antennas Propag., vol. 59, pp. 2152-2159, Jun. 2011.

Oliveri et al., "Complex-Weight Sparse Linear Array Synthesis by Bayesian Compressive Sampling," IEEE Trans. Antennas Propag., vol. 60, pp. 2309-2326, May 2012.

Oliveri et al., "Rectangular Thinned Arrays Based on McFarland Difference Sets," IEEE Trans. Antennas Propag., vol. 59, pp. 1546-1552, May 2011.

Papathanasopoulos et al., "A novel collapsible flat-layered metamaterial gradient-refractive-index lens antenna," IEEE Trans. Antennas Propag., vol. 68, No. 3, pp. 1312-1321, 2020.

Petosa et al., "Design and performance of a perforated dielectric fresnel lens," IEE Proc.—Microw., Antennas Propag., vol. 150, pp. 309-314, Oct. 2003.

Qu et al., "Wide-Angle Scanning Lens Fed by Small-Scale Antenna Array for 5G in Millimeter-Wave Band," IEEE Trans. Antennas Propag., vol. 68, pp. 3635-3643, May 2020.

Robinson et al., "Particle swarm optimization in electromagnetics," IEEE Transactions on Antennas and Propagation, vol. 52, No. 2, pp. 397-407, 2004.

Rocca et al., "Unconventional Phased Array Architectures and Design Methodologies—A Review," Proc. IEEE, vol. 104, pp. 544-560, Mar. 2016.

Saka et al., "Pattern optimization of a reflector antenna with planar-array feeds and cluster feeds," IEEE Trans. Antennas Propag., vol. 45, p. 93-97, Jan. 1997.

Sletten, Reflector and Lens Antennas. John Wiley Sons, 1988, 8 pp.

Soumitra Biswas et al., "High gain, wide-angle QCTO-enabled modified Luneburg lens antenna with broadband anti-reflective layer," Nature Sci. Rep., vol. 10, No. 1, 2020.

Su et al., "A flat dual-polarized transformation-optics beamscanning luneburg lens antenna using pcb-stacked gradient index metamaterials," IEEE Trans. Antennas Propag., vol. 66, pp. 5088-5097, Oct. 2018.

Van den Biggelaar et al., "64 element active phased array as focal plane array feed for reflector antennas for mm-wave wireless communications," in 2020 14th European Conf. Antennas Propag. (EuCAP), pp. 1-5, 2020.

Wang et al., "A 3-D-Printed Multibeam Dual Circularly Polarized Luneburg Lens Antenna Based on Quasi-Icosahedron Models for Ka-Band Wireless Applications," IEEE Trans. Antennas Propag., vol. 68, pp. 5807-5815, Aug. 2020.

Wang et al., "A Scanning Angle Adjustment Method for Array-Fed Lens Antenna Systems," IEEE Antennas Wireless Propag. Lett., vol. 20, pp. 868-872, May 2021.

Wang et al., "The Systematic Design of Non-commensurate Impedance Matching Tapers for Ultra Wideband Gradient-Index (GRIN) Lens Antennas," IEEE Trans. Antennas Propag., pp. 1-1, 2021.

(56) References Cited

OTHER PUBLICATIONS

Yin et al., "A 37-42-GHz 8×8 Phased-Array With 48-51-dBm EIRP, 64-QAM 30-Gb/s Data Rates, and EVM Analysis Versus Channel RMS Errors," IEEE Trans. Microw. Theory Techn., pp. 1-1, 2020.
Zhang et al., "Ultra-Wideband Flat Metamaterial GRIN Lenses Assisted with Additive Manufacturing Technique," IEEE Trans. Antennas Propag., pp. 1-1, 2020.

* cited by examiner

1100

1500

1500

1500

2300

2300

SPARSE PHASED-ARRAY-FED FOCUSING APERTURE ANTENNAS WITH REDUCED GRATING LOBES

CROSS-REFERENCE TO RELATED APPLICATIONS

This application claims priority to and is a divisional of U.S. patent application Ser. No. 17/725,547 filed on Apr. 21, 2022 and entitled "SPARSE PHASED-ARRAY-FED FOCUSING APERTURE ANTENNAS WITH REDUCED GRATING LOBES", which claims priority to U.S. Provisional Application No. 63/177,332 filed on Apr. 20, 2021 and entitled "SPARSE PHASED-ARRAY-FED FOCUSING APERTURE ANTENNAS WITHOUT GRATING LOBES", and this application further claims priority to U.S. Provisional Application No. 63/283,817 filed on Nov. 29, 2021 and entitled "SPARSE PHASED-ARRAY-FED ANTENNAS FOR LOW-POWER BEAMFORMING", each of which are hereby incorporated by reference in their entireties. This application is also related to U.S. patent application Ser. No. 17/721,898 filed on Apr. 15, 2022 and entitled "LENS ANTENNA SYSTEMS AND METHODS", which is hereby incorporated by reference in its entirety.

STATEMENT REGARDING FEDERALLY SPONSORED RESEARCH OR DEVELOPMENT

This invention was made with partial support by the Department of the Navy, Office of Naval Research under contract N00014-20-C-1067. The government has certain rights in the invention.

BACKGROUND

A phased array antenna may include a two dimensional array of antenna elements. For example, FIG. 1A shows an example phased array 400, that includes numerous small antenna elements (the hexagon shapes within the array).

Those antenna elements may be used to enhance how an antenna functions (both for transmitting and receiving signals), as opposed to an antenna with only one element capable of receiving or transmitting signals. FIG. 1B shows how such a phased array may further be combined with a lens or reflector to further enhance the capabilities of an antenna.

In the configuration shown in FIG. 1B, the phased array 210 is being used to transmit signals. In particular, the phased array 210 (which may be similar to the phased array 400 shown above) is used to generate a directional signal that reflects off of reflector 205 in order to have the beam or signal angled in the direction shown by arrow 223. This effect is accomplished by using different elements of the phased array 210 to generate a directional signal 220, which is then further enhanced by the parabolic shape of the reflector 205.

In addition to a parabolic reflector as shown above, some phased array antennas also may use a lens to achieve a similar enhancement. For example, a lens instead of a reflector may be used to direct and focus incoming or outgoing signals or beams. For example, FIGS. 2A and 2B show how a phased array 15 and a lens 11 may be used together to achieve a similar effect as a phased array and reflector as described herein.

Accordingly, these types of antenna systems described above are sometimes referred to phased array fed lens (PAFL) antennas or phased array fed reflector (PAFR) antennas. Each of U.S. Pat. Nos. 3,755,815 and 10,193,240 are incorporated herein by reference in their entirety.

While phased array antennas generally work for their intended purpose, there is an identifiable desire for improvements in the features in or associated with phased array antennas.

Figure 1A:
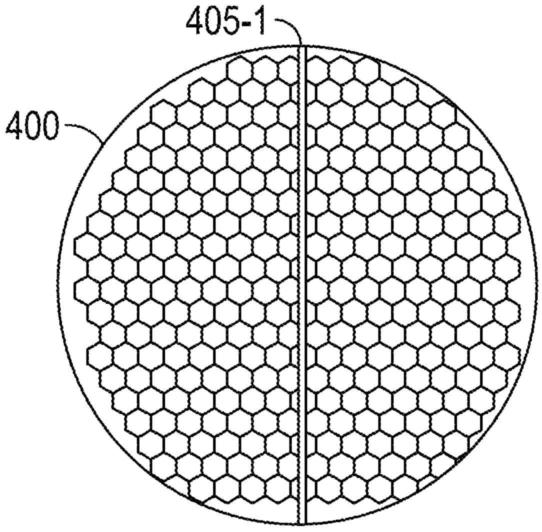
FIG. 1A illustrates an example partitions phased array.
Figure 1B:
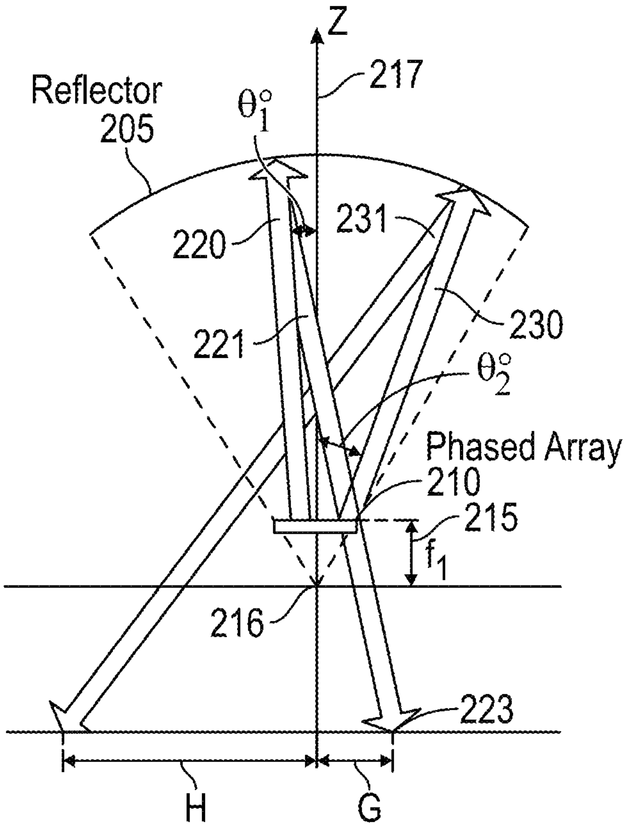
FIG. 1B illustrates a phased array fed reflector (PAFR) antenna.

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DETAILED DESCRIPTION

The following description of example methods and apparatus is not intended to limit the scope of the description to the precise form or forms detailed herein. Instead the following description is intended to be illustrative so that others may follow its teachings.

Phased array antennas have specific antenna elements in a two dimensional phased array spaced at certain distances from one another. In various types of antennas, that spacing may be specifically designed or set to ensure that the antenna works correctly for its desired purpose. If elements of a phased array antenna are not properly spaced, an antenna will not work correctly and errors may be introduced in either the transmitted or received signals. Phased array antennas therefore may have spacing between their phased array elements limited at half the wavelength of the type of waves the system is designed for to prevent errors such as grating lobes.

In particular, described herein are various embodiments for spacing the elements in a phased array to be greater than half the wavelength of the waves in which the system is used (i.e. phased array element distance or spacing is greater than λ/2 (>0.5λ)) but still minimizing errors like grating lobes that may impact whether information can be properly transmitted or received in a signal. In other words, described herein are phased array antennas that have elements with greater than half wavelength spacing between elements of the phased array. A nominal wavelength of the signals or beams used in the various embodiments herein may be anywhere from 3.75 millimeters (mm) to 37.5 mm. For example the nominal wavelength may be 3.75 mm, 5 mm, 7.5 mm, 10 mm, 12.5 mm, 15 mm, 17.5 mm, 20 mm, 22.5 mm, 25 mm, 27.5 mm, 30 mm, 32.5 mm, 35 mm, or 37.5 mm in various embodiments.

Figure 3:
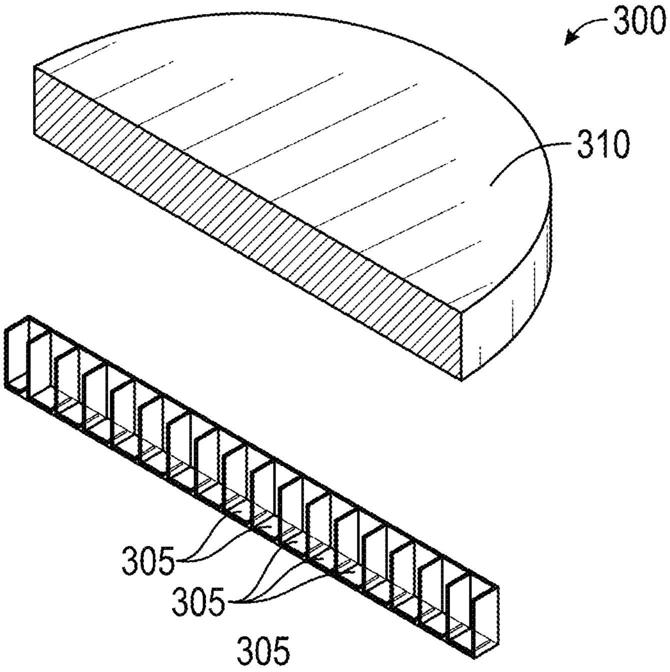
FIG. 3 illustrates an example phased array of feed elements and a lens in accordance with embodiments of the present disclosure.

In various embodiments, a phased array antenna may include a one or two dimensional array of antenna elements. For example, FIG. 3 shows a cross section 300 of a one dimensional array of antenna feed elements 305, as well as a lens 310 above the elements (e.g., PAFL).

The multiple antenna elements 305 may be used to enhance how an antenna functions (both on transmit and receive), as opposed to an antenna with only one element capable of receiving or transmitting signals. In particular, multiple of the elements 305 may be used together by generating signals at multiple feed elements 305 that constructively interfere with one another to created steered beams. In other words, signals may be generated at the elements 305 that cause a combined output signal of the array to be output in different directions or angles to steer the signal in a particular direction. The lens 310 may further help enhance this effect, by increasing the degree to which beams may be steered. This effect is shown, by way of example, in FIGS. 2A and 2B.

Figure 2A:
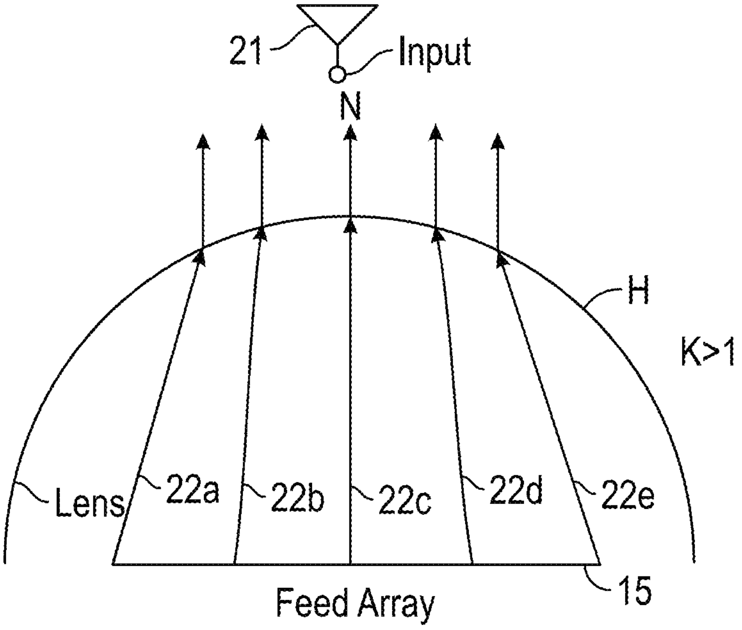
FIG. 2A illustrates a ray diagram of a convergent beam from a phased array directed at a lens.
Figure 2B:
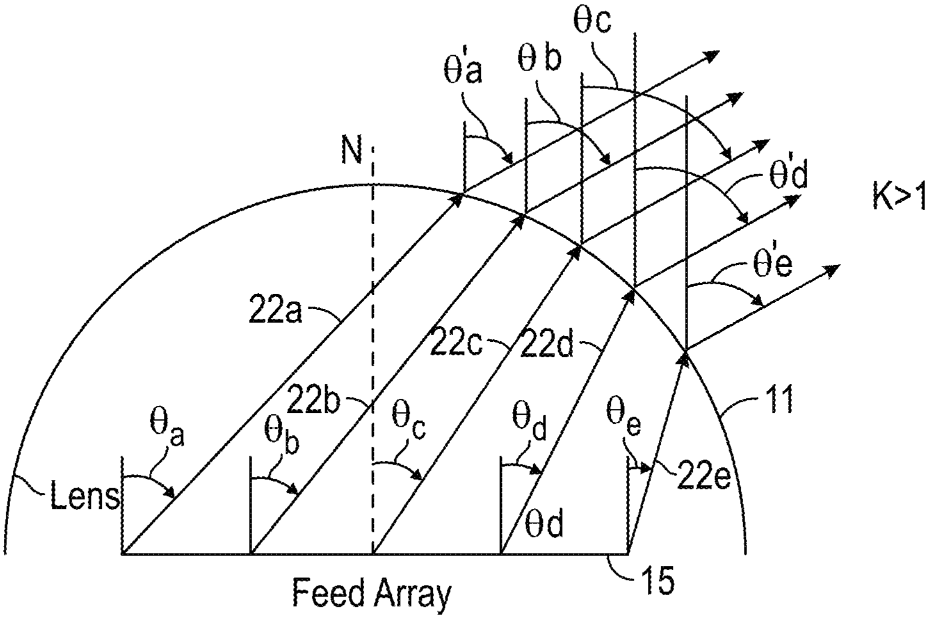
FIG. 2B illustrates a ray diagram of a phased array convergent beam directed at a lens.

In the configuration of FIGS. 2A and 2B, the phased array 15 is being used to transmit a signal. In particular, the phased array 15 is used to generate a directional signals 22*a*-22*e* at various angles that may be further angled using lens 11.

The lens used may further be a gradient index (GRIN) lens, a lens that uses refractive capabilities of a material to form a lens that may operate similar to a normal lens but with flat surfaces. A GRIN lens may be specially configured to enhance the capabilities of a system using a phased array antenna, such as to make a package including phased array feed elements and a lens more compact or smaller. Any of the lenses or combinations of lenses described in U.S. patent application Ser. No. 17/721,898, which is incorporated herein in its entirety, may also be used additionally or alternatively to the lenses described herein, such as the lens 310 of FIG. 3.

In many prior phased array antenna systems, the spacing of the feed elements in a phased array antenna is typically 0.5λ or less, which reduces the presence of errors called grating lobes. (Where λ is the wavelength of the signal being used by the system.) Grating lobes are signals that are unintentionally created at an output angle that is not desired, and of a similar power level as the desired signal.

In various embodiments described herein, a configuration proposed of a phased array antenna with a reflector or a lens such as a GRIN lens, elements of the array may be spaced at distances greater than 0.5λ, including up to 1.0λ. In addition, in using the phased array antenna with a reflector of lens, beams may be formed by using fewer than all of the array elements present in a system while still avoiding grating lobes. This may occur because the enhancements provided by the lens or reflector may render using all of the feed elements to form a particular beam or signal unnecessary. In other words, a steered beam signal may be transmitted or received using less than all of the phased array antenna elements that may be spaced at distances greater than 0.5λ, and that signal may be further focused, steered, or directed by a reflector or lens to further enhance the signal such that data meant to be communicated is not lost due to errors such as grating lobes.

In various embodiments, a single lens (e.g., a GRIN lens) or single reflector may be positioned over a phased array antenna for enhancing the phased array antenna. In other embodiments, multiple different reflectors or lenses may be used. For example, a series of lenses may be used, and/or multiple lenses each associated with individual phased array elements or a subset of phased array elements may be used in an antenna. Similarly, multiple reflectors may be used in various embodiments in a similar manner (e.g., in a series of reflectors and/or using reflectors associated with individual phased array elements or groups of phased array elements).

Accordingly, described herein are focusing aperture antennas (such as a lens antenna or a reflector antenna) with a sparsely-spaced antenna array feed network for the purpose of producing high-performance scanned beams while reducing the number of elements required in the antenna to cover the field of view for grating-lobe-free beam scan. A key technical element is the gain ripple (or scalloping) versus scan angle. As the feeds in previous antenna systems are spaced beyond 0.5λ the gain may begin to ripple. In the embodiments described herein, the antenna array element spacing as well as the lens and/or reflector of the system may be optimized such that an acceptably small amount of ripple may be present, while minimizing the gain ripple that would interfere with properly transmitting or receiving a signal.

The embodiments described herein have many advantages. The embodiments described herein create a higher quality aperture field which results in a higher quality beam (e.g., with lower sidelobes, lower aberrations, higher EIRP). As another example of an advantage of the embodiments described herein, greater antenna array element spacing may result in a lower cost antenna because less total antenna array elements may be used in a given array. Fewer antenna array elements may also cause an antenna array to weigh less and be easier to fabricate. In addition, the power used by the antenna array may be less because there are fewer antenna array elements that must be powered. In embodiments where only a subset of antenna array elements is used to receive or transmit a signal, this advantage may be further enhanced. In addition, the greater spacing of antenna array elements adds more space, which is advantageous for keeping the array elements cool and preventing them from overheating and/or being damages or otherwise losing effective use. In addition, the embodiments where a subset of array elements are used would further enhance the heat management advantages described herein because not all array elements must be used at one time to receive or transmit a signal.

The advantages related to using fewer antenna array elements are significant. For example, reducing the number of antenna elements (and therefore active components) may reduce the number of antenna elements by a number equal to the square of the spacing factor. For example, if a 0.5λ spaced array is converted to a 0.75λ spaced array, the spacing factor is 0.75/0.5=1.33 so there will be 1.33^2=1.77 times fewer elements). This reduces power dissipation making the system more efficient, reduces heating, and directly reducing cost. To avoid grating lobes, the focusing aperture antenna (reflector or lens) converts the focal fields to a continuous aperture distribution without grating lobes. The sparse-antenna arrays described herein can also produce higher quality beams with lower scan loss.

Accordingly, the systems and methods described herein combine antenna arrays as feeds of a focusing aperture antenna (such as a reflector, lens, or GRIN lens antenna) in order to produce high-quality, grating-lobe-free beam-scanning across a hemisphere with a significantly reduced number of antenna elements. This may directly reduce power consumption and cost related to the integrated circuits required for beam-scanning antenna arrays (e.g., RF beamforming ICs) and also provides for higher-quality beams than a conventional focusing aperture antenna alone.

In one example embodiment, a PAFL antenna system may have increases antenna element array spacing to 0.75λ. In the example, a 0.8 dB ripple was observed, which is very minor in many applications and no grating lobes were observed. Thus, a 0.707λ spaced PAFL with a 2D lens may have ½ the number of elements of a 0.5λ array and will have even lower ripple than the 0.75λ example. Such a configuration may cut cost of the array elements by half and power consumed by approximately half. In other embodiments, up to 1λ may be used, which would result in ¼ the number of feeds used as opposed to the 0.5λ spacing.

In various embodiments, a GRIN lens may be specifically designed to prefer widely spaced feeds (in contrast to a homogeneous lens or reflector). This is possible because of the additional degrees of freedom provided by a GRIN lens. For example, the aperture of the lens may be manipulated or adjusted in a GRIN lens to achieve a desired configuration. The shape of a GRIN lens (e.g., planar surfaces) may also offer advantages in the size of packaging for a phased array antenna system with a lens, thereby achieving greater focusing effects than a different type of lens that takes up a similar amount of space.

A second lens (or even a continuous volume/manifold) may also be used between a feed plane of the system and the aperture lens which focuses the lens to broadly spaced (sparse) feed elements to achieve a desired configuration and benefits for a system.

Figure 4:
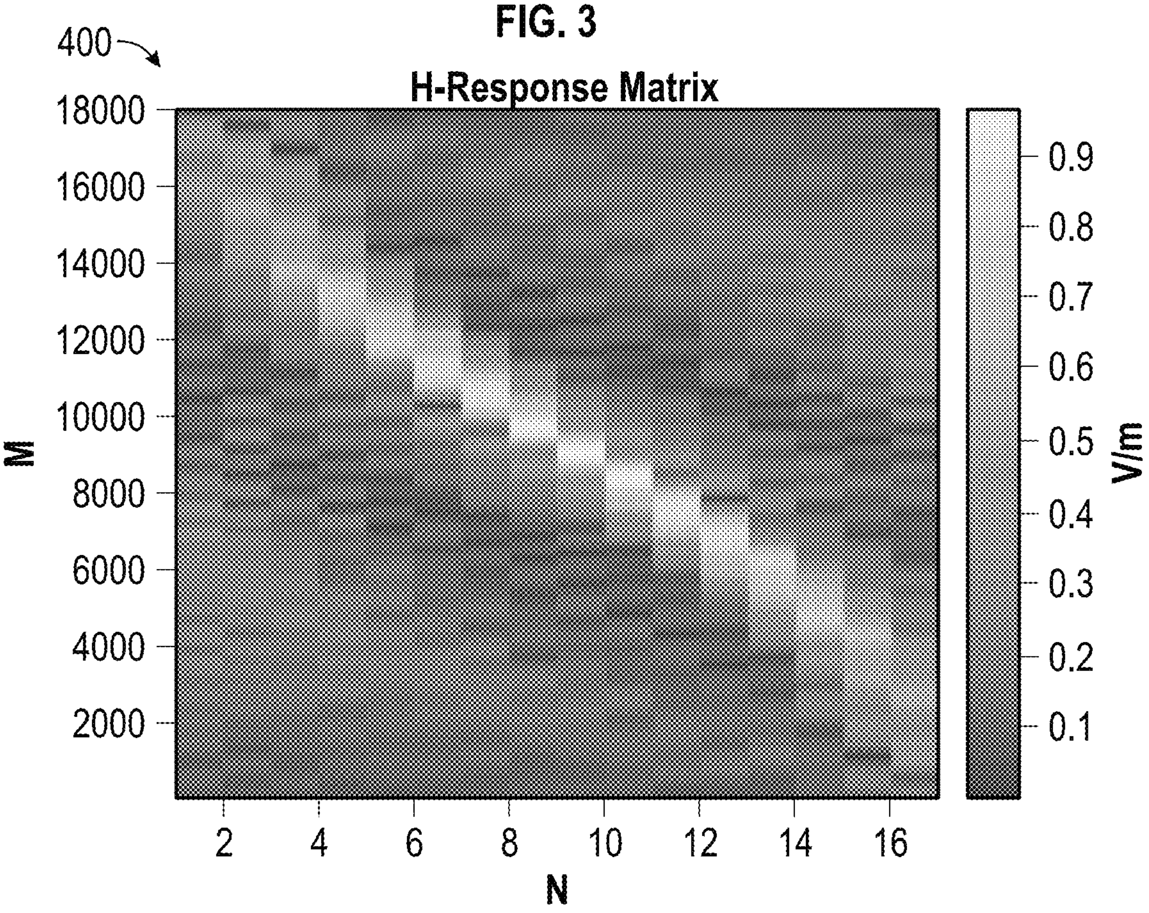
FIG. 4 illustrates an example lens response matrix of a lens in accordance with embodiments of the present disclosure.
Figure 5:
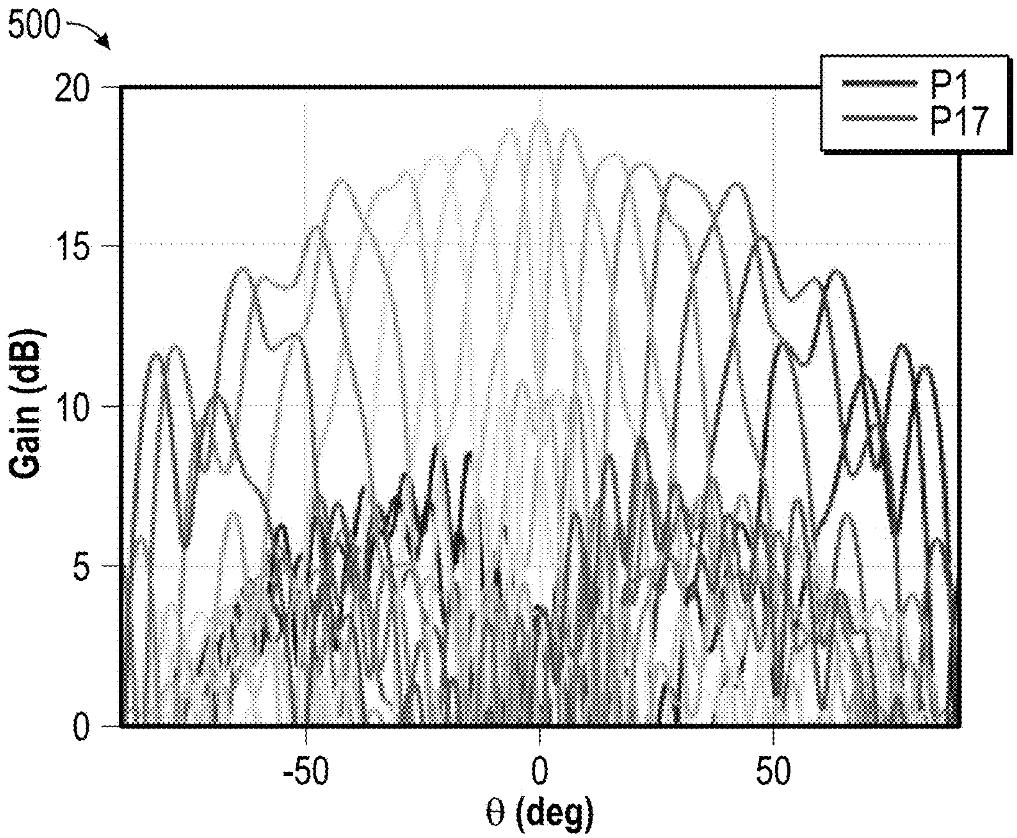
FIG. 5 illustrates an example output pattern of multiple feeds of a phased array in accordance with embodiments of the present disclosure.

A test was performed that showed positive results for an example embodiment of a sparse phased array antenna used with a GRIN lens as described herein. For example, a 4 inch lens at 40 gigahertz (GHz) with 17 feed elements (for 0.5λ spacing) compared to 13 feed elements (for 0.75λ spacing) aligned along a φ-cut was used, similar to the setup of FIG. 3. The lens had a response matrix as shown in FIG. 4. A pattern showing each of the 17 feed elements is shown in FIG. 5. In particular, 0.75λ for an antenna system was tested and was capable of generating or receiving high quality signals using only a portion of the total feed elements (e.g., using 6 of 13 total feeds in a one dimensional antenna array).

In various embodiments, the spacing of feed elements in an array may be anywhere between 0.5λ and 1λ, including as examples, 0.5λ, 0.55λ, 0.6λ, 0.65λ, 0.7λ, 0.707λ, 0.75λ, 0.8λ, 0.85λ, 0.9λ, 0.95λ, or 1λ. In various embodiments, an array may also have variable spacing, such that spacing between individual elements is different from the spacing between other individual elements. Such spacing may also be variable between 0.5λ and 1λ.

Figure 6:
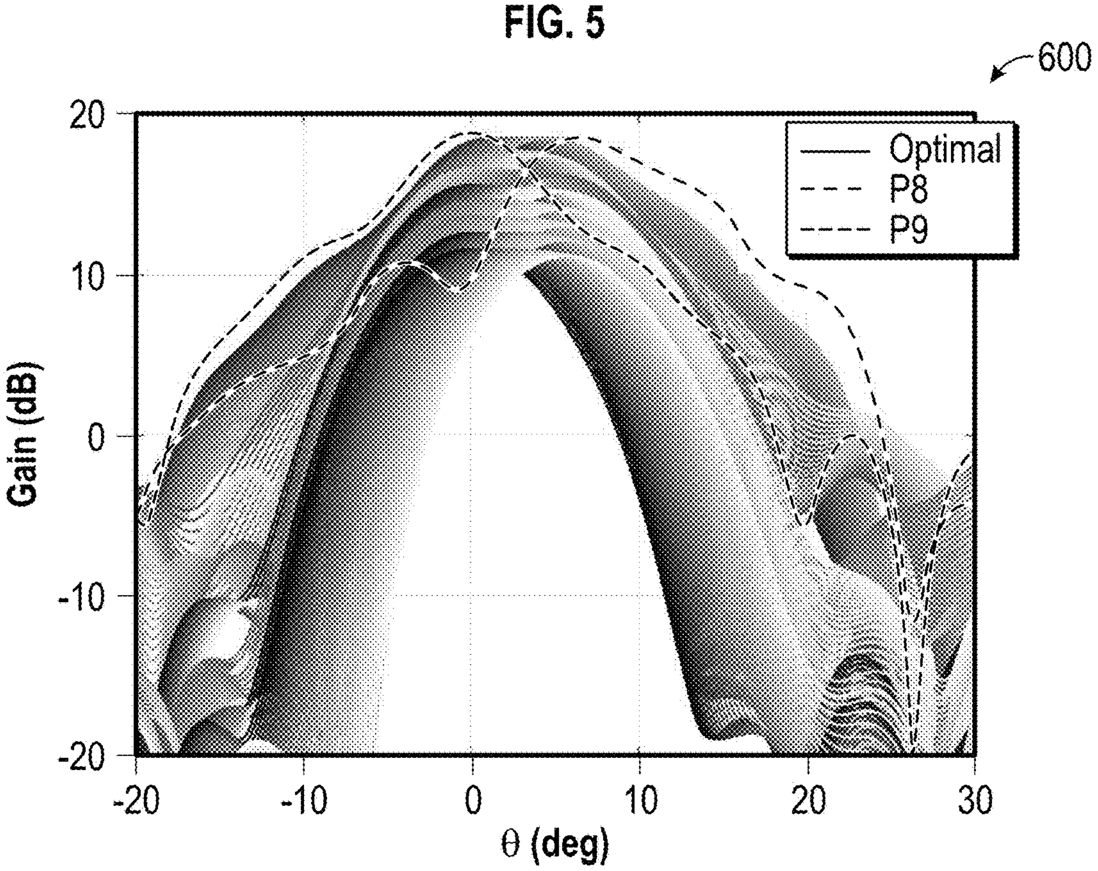
FIG. 6 illustrates an example output of phased array using 0.5λ spacing in accordance with embodiments of the present disclosure.
Figure 7:
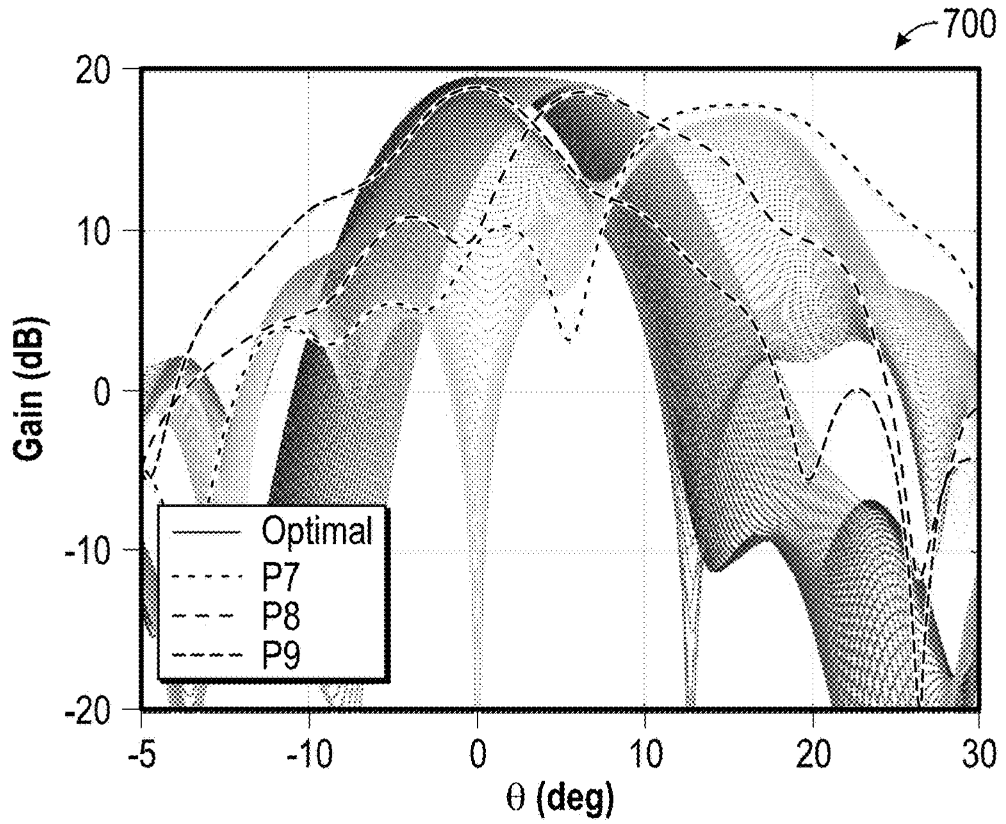
FIG. 7 illustrates an example output of phased array using 1.0λ spacing in accordance with embodiments of the present disclosure.

In particular, during the testing using 0.5λ spacing, results shown in FIG. 6 were achieved, where continuous beam-scanning is possible with complex weights, and two feed (e.g., blue to green) works and six feeds (e.g., cyan to magenta) provides increased sidelobe control. As such, high-quality beamforming may be accomplished with this setup using a reduced number of feeds (e.g., 6-8). FIG. 6 specifically shows a visualization for each of feeds 2-16 in a setup of 17 feeds, with a minus (–) 1 dB offset to provide better visualization. FIG. 7 shows an example what it would look like to attempt to us 1.0λ spacing using the 0.5λ spacing setup.

Figure 8:
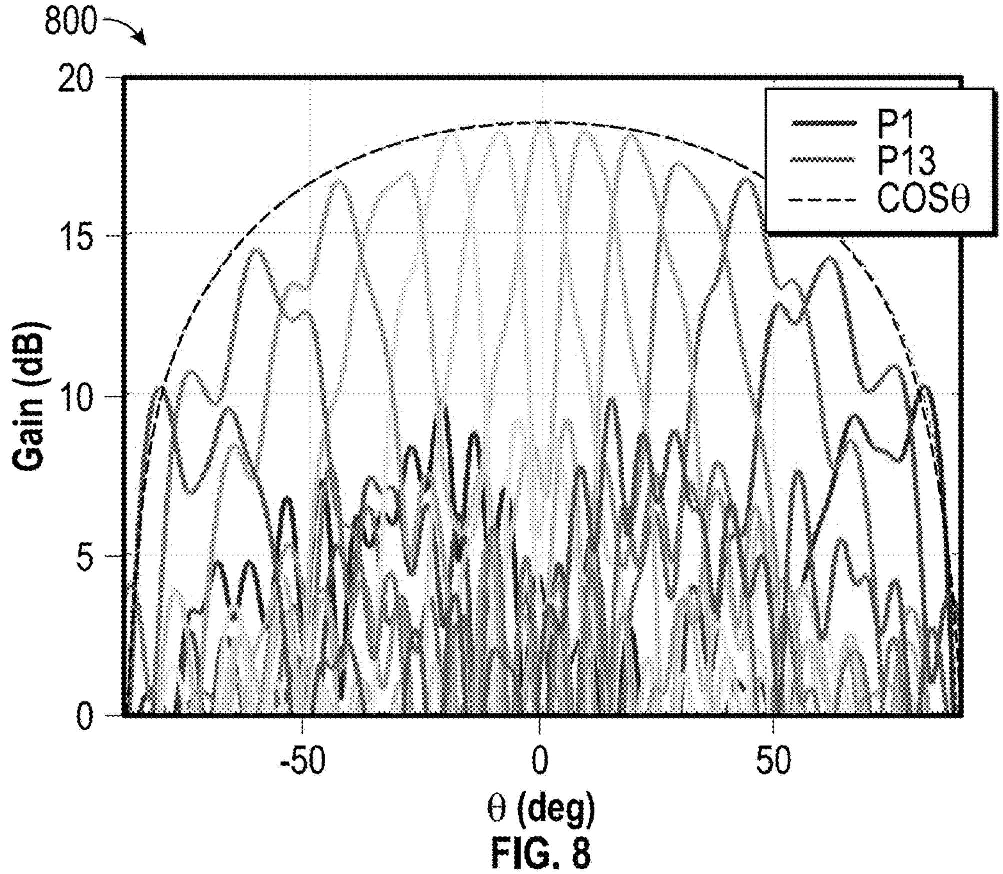
FIG. 8 illustrates an example output pattern of multiple feeds of a phased array using 0.5λ spacing in accordance with embodiments of the present disclosure.
Figure 9:
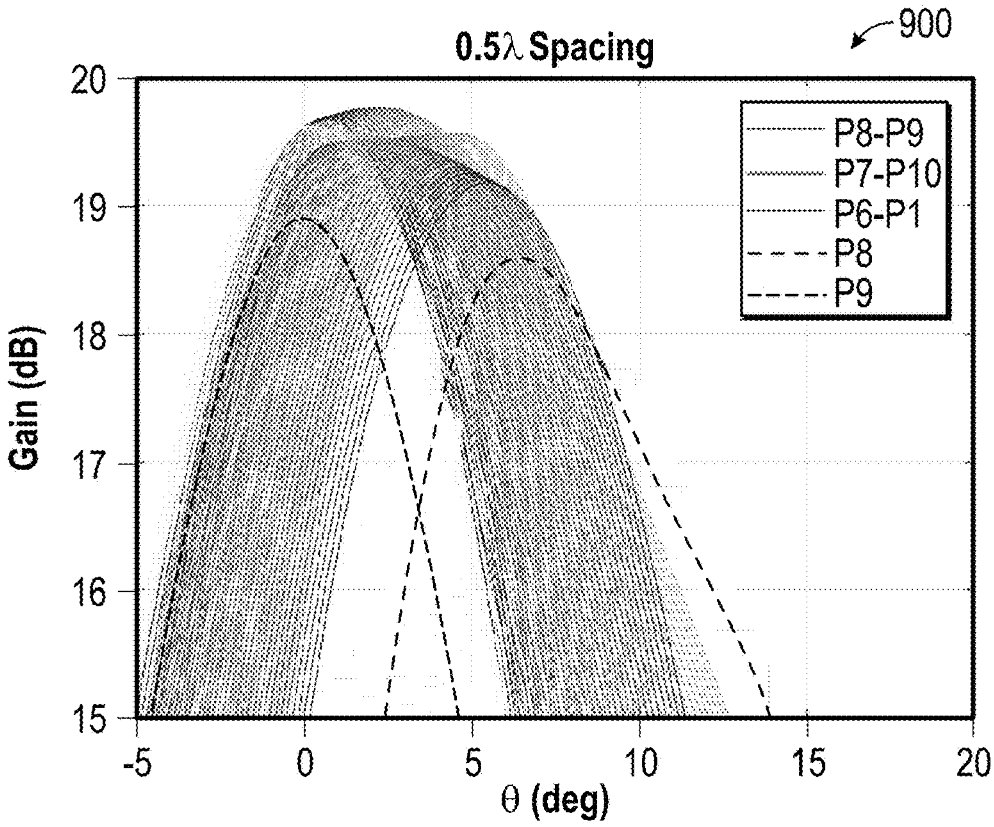
FIG. 9 illustrates null filling using a phased array with 0.5λ spacing in accordance with embodiments of the present disclosure.
Figure 10:
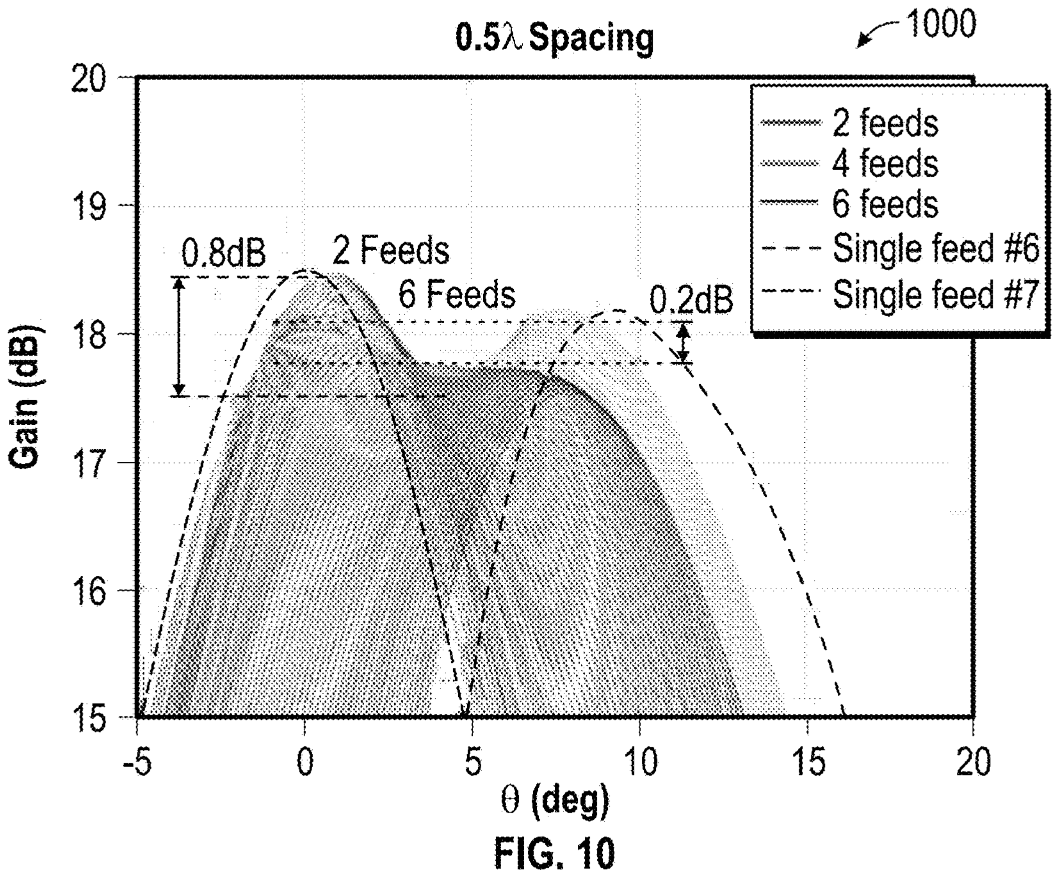
FIG. 10 illustrates null filling using a phased array with 0.75λ spacing in accordance with embodiments of the present disclosure.

FIGS. 8-10 further show the results of the test comparing the 0.5λ spacing to results for a 0.75λ spacing (e.g., 13 feeds instead of 17 as described above). A pattern showing each of the 13 feed elements for 0.75λ spacing is shown in FIG. 8 (compare to FIG. 5 with 17 elements for 0.5λ spacing). FIG. 9 shows results for the 0.5λ spacing, while FIG. 10 shows results for the 0.75λ spacing. Accordingly, advantageous results may still be achieved using the 0.75λ spacing setup, including, e.g., with only using six feeds (P4-P9) out of thirteen total with little loss and good side lobe control. Other setups and results are further described herein below.

Figure 11A:
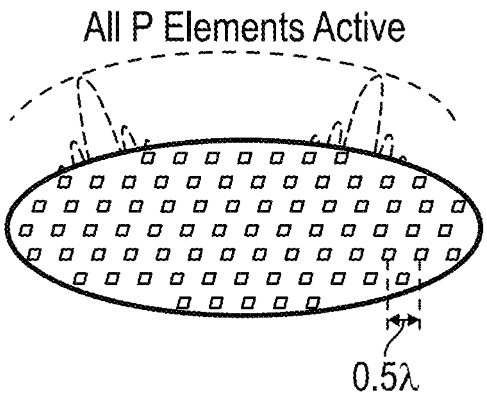
FIG. 11A illustrates a phased array with 0.5λ spacing in accordance with embodiments of the present disclosure.
Figure 11B:
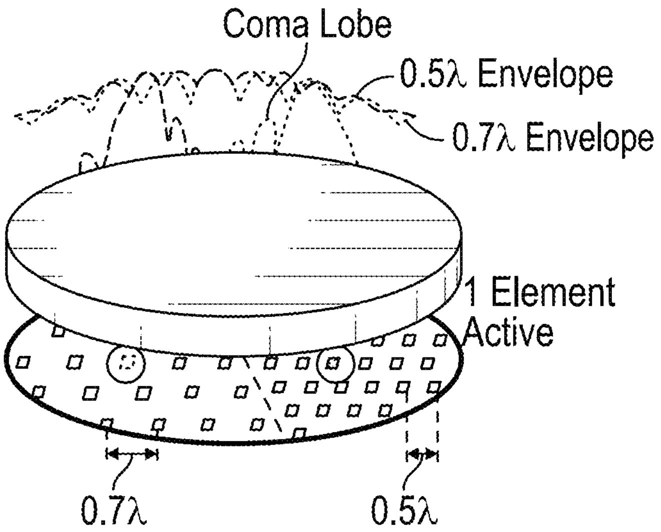
FIG. 11B illustrates a switch-beam lens antenna in accordance with embodiments of the present disclosure.
Figure 11C:
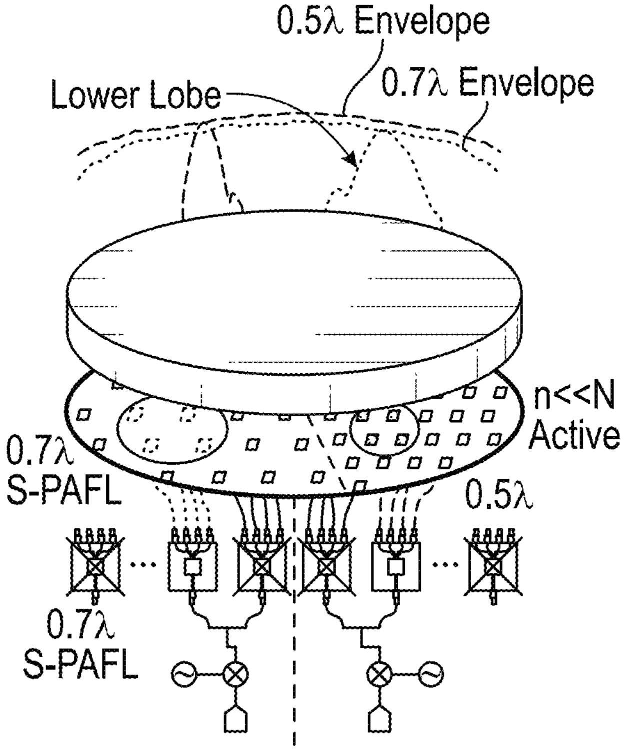
FIG. 11C illustrates a sparse phased-array-fed lens (S-PAFL) antenna in accordance with embodiments of the present disclosure.
Figure 11D:
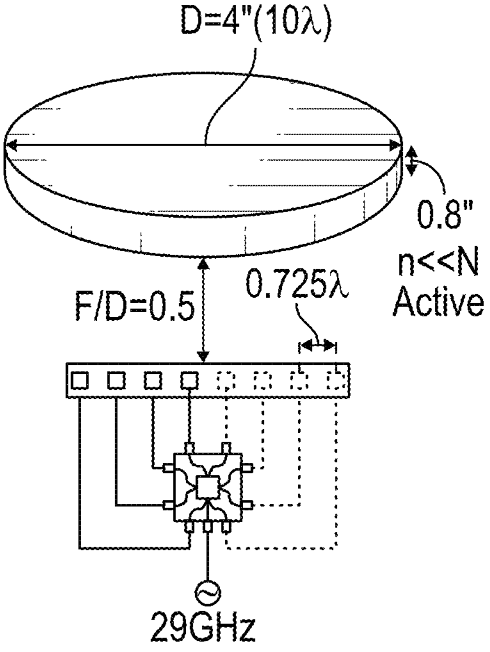
FIG. 11D illustrates an S-PAFL antenna with a four inch gradient-index (GRIN) lens in accordance with embodiments of the present disclosure.

For example, described below is also a sparse phased-array-fed lens (S-PAFL) setup comprising a 4" aperture GRIN lens antenna, an 8-element 0.725λ-spaced linear patch array operating at 29 GHz, and a Ka-band SATCOM beamformer IC. The S-PAFL setup achieved maximum gain at all angles and improved scan loss by 4 dB at ±50°. Recent advances in millimeter wave (MMW) communications have ushered in a new era of high speed wireless data proliferation. Emerging 5G mobile wireless networks and low earth orbit (LEO) satellite-enabled space internet will make extensive use of the MMW bands. High performance beamforming antennas are essential to the realization of these services and are anticipated to be deployed on a massive scale: it is estimated that by 2030 over 2 million base-stations (BS) and small cells (SC) may be deployed in 5G-MMW infrastructure and by 2040 up to 19 million LEO SATCOM terminals will be installed with end-users (e.g., homes). An antenna system for these applications may be the phased array antenna (PAA) as depicted in FIG. 11A. PAAs may have exceptional beamforming performance and consistently achieve low scan loss, wide FoV, multibeam capabilities, and beam-shaping. FIG. 11A specifically shows a phased-array requires 0.5λ-spaced feeds (to avoid grating lobes) and exhibits low scan loss across the FOV with low sidelobes and flexible beamshape. All N feeds are active for all beams. FIG. 11B shows how switch-beam lens antennas provide low-cost and low-power beamscanning but may not be capable of scanning to arbitrary angles or shaping the beam. As a result, ripples may appear in the scan envelope, which worsen as the array spacing increases (e.g., from 0.5λ to 0.7λ). FIG. 11C shows an example of a current embodiment of a sparse phased-array-fed lens (S-PAFL) antenna combining a widely spaced (0.7λ) phased-array feed with a lens to reproduce the capabilities of a phased array (smooth scan envelope, controlled sidelobes, low-coma lobes, and even multibeam operation) at a fraction of the cost and power consumption. FIG. 11D an example S-PAFL in this work is a 4" gradient-index (GRIN) lens antenna and an 8-element 29 GHz linear patch array (0.725λ-spaced) driven by a Ka-band SATCOM transmit beamformer IC.

However, in order to realize a larger degree of reconfigurability, PAA array elements may maintain a sub-λ/2 spacing. High-gain PAAs may therefore use a larger number (P, ranging from 100's to 1000's) of elements and corresponding beamformer ICs, making PAA solutions costly and power-inefficient. An alternative approach to PAA beam-scanning is the switched-beam gradient index (GRIN) lens antenna as shown in FIG. 11B. Modern MMW GRIN lenses demonstrate high aperture efficiency and extremely wide bandwidths. GRIN lenses may also achieve high quality beam-scanning over a wide FoV by utilizing Luneburg-type lenses. In a switched beam configuration, each feed element beneath the lens generates a beam at a particular angle and scanning is achieved by activating one element at a time. Given the passive nature of the lens structure and the near absence of active electronics, switched-beam beamformers are highly power efficient. However, switched-beam systems may be constrained by the element sampling and therefore cannot scan to arbitrary angle or apply beam-shaping. The latter is of particular concern for far-scanned beams where beam qualities (e.g., max gain, side lobe level, coma lobe) are most degraded. The beamforming performance of switched beam systems may be improved by feeding the focusing element with a PAA—this approach has been demonstrated with both lens systems and reflectors (for which the low-power switched beam method is also viable). In the latter context, the phased-array-fed-reflector (PAFR) technique is employed to achieve optimal illumination and is not typically used for wide angle scanning. Indeed, PAFRs demonstrate a high degree of flexibility but may be constrained by the limited FoV intrinsic to high-gain reflector systems.

Phased array fed lens (PAFL) designs may be advantageous for wide-FoV applications fully explored. As such, described herein are embodiments for a sparse phased-array-fed lens (SPAFL) antenna which combines a widely spaced (>0.5λ) phased-array feed with a lens as shown in FIG. 11C. The S-PAFL may have a smooth scan envelope (with reduced scan loss relative to a single lens antenna), engineered (reduced) sidelobes, low-coma lobe, and even multibeam operation. Due to the array sparsity, the S-PAFL may also have fewer total feed array elements (N<P): for example, with an array spacing of p(2)λ, N=P/2 and the S-PAFL only requires half the number of beamformer ICs compared to a similar-sized PAA. Furthermore the S-PAFL can generate a given beam using a small number, n, of the available feed elements. The S-PAFL offers a continuous trade-space between a PAA (P active feed elements) and a switch beam antenna (1 active feed element). That is, 1<n<<N<P may represent a significant cost savings and potentially orders of magnitude lower power dissipation relative to a PAA while being able to produce significantly higher quality beams than a switch-beam lens antenna and at arbitrary angles. The flexibility, performance, and potential for cost and power savings of the S-PAFL offer an advantageous solution for the massive deployments of high performance MMW beam scanning antennas that are required for current and future wireless communications systems.

An advantage of the embodiments herein is that a theoretical framework for phased-array-fed apertures (PAFAs) is provided—specifically, an optimal solution for PAFAs is described which may use only far-field quantities instead of near-fields at the feed plane (which may be a more challenging quantity to measure). Therefore the methods described herein are simpler to implement. Another advantage of the embodiments herein is an explanation of the tradeoffs of feed spacing and embodiments that demonstrate that spacings on the order of 0.7λ may be useful in various contexts. High quality beamscanning has also been demonstrated with the proposed method, achieving a scan loss exponent improvement from 5.0 to 3.2 for 0.5λ feeds and 3.6 for 0.7λ-spaced feeds. Finally, methods have been demonstrated that may be used to realize many of the most important capabilities of a PAA, showing that the S-PAFA (or specifically an S-PAFL) may be a low-cost and low-power replacement for a PAA in various applications. Ultimately, embodiments presented herein, such as a 0.725λ-spaced example, uses 2.1× fewer feed elements and requires as few as 4-6 active elements to produce high quality beams, shown on FIG. 11D. This represents a dramatic reduction in power consumption and cost relative to a phased array while providing the high performance necessary for current and future MMW beamscanning systems.

Figure 12A:
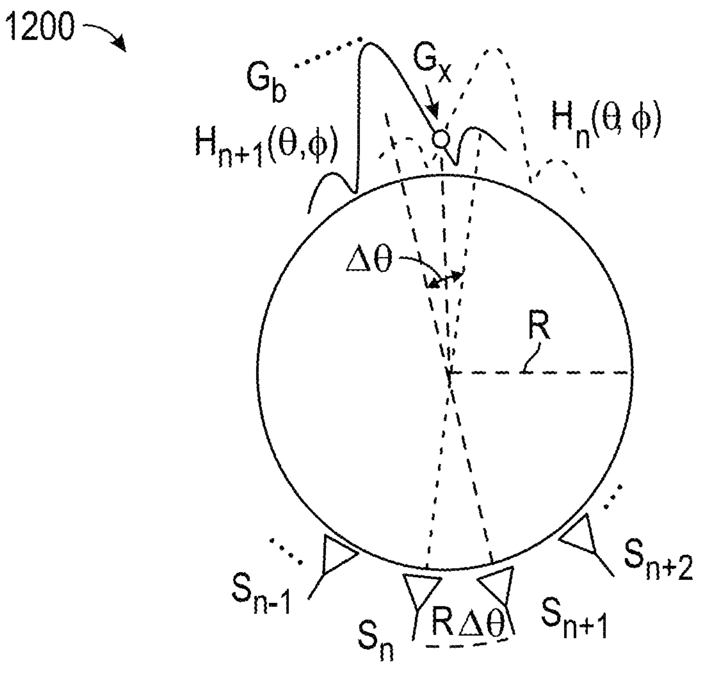
FIG. 12A illustrates an S-PAFL lens with an idealized lens in accordance with embodiments of the present disclosure.
Figure 12B:
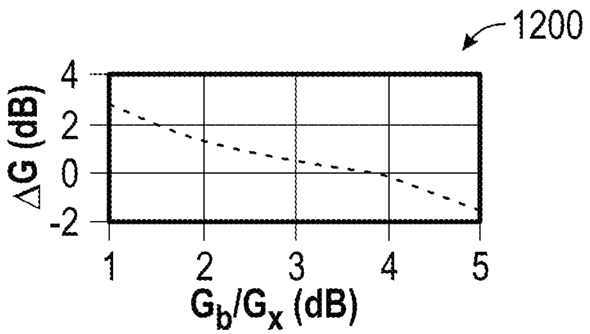
FIG. 12B illustrates a difference in gain between and optimal-gain synthesized beam relative to a gain of one of its basis beams in accordance with embodiments of the present disclosure.
Figure 12C:
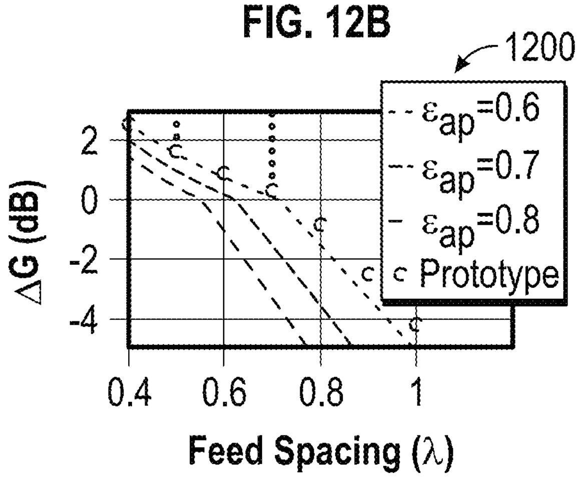
FIG. 12C illustrates gain improvement of a synthesized null-steered beam over the basis beam versus feed spacing for multiple aperture efficiencies in accordance with embodiments of the present disclosure.

FIG. 12A shows a model of a S-PAFL system: an idealized lens is described by the matrix H and the total field from combination of all N complex-weighted feeds is e(1). The complex weight driving the $n^{th}$ feed is $s_n$. A single feed with weight $s_n$ produces a sinc (θ) radiation pattern $H_n$, referred to as basis beams, which forms the $n^{th}$ column of H. Feeds n and n+1 are separated by angle Δθ and arc length RΔθ at a crossover level $G_x$ occurring at angle Δθ/2. The ratio of the basis beam gain $G_b$ to $G_x$ at the angle is referred to as the crossover point. FIG. 12B shows the difference in gain between an optimal-gain synthesized beam at the crossover angle relative to the gain of one of the basis beams (at the basis beam angle) where 0 dB corresponds to gain at the crossover angle (or null angle) equal to the closest basis beam gain and indicates the level beyond which a beam-scanning antenna will exhibit gain ripple versus continuous scan angle. As such it represents a cutoff for high-performance operation. FIG. 12C shows gain improvement of the synthesized null-steered beam over the basis beam versus feed spacing for multiple aperture efficiencies. Measured crossover points for 0.1λ-spaced measurements of Section III are included (purple circle markers). 0.7λ is the approximate maximum spacing for no gain ripple versus scan angle. Vertical dashed lines indicate the spacings exhibited in FIG. 14 discussed below.

In order to motivate sparse feed elements consider the idealized S-PAFL system shown in FIG. 12A in which the n and n+1 feed elements produce far-field electric fields, $E_{\theta,n}(\theta,\varphi)$, $E_{\varphi,n}(\theta,\varphi)$ and $E_{\theta,n+1}(\theta,\varphi)$, $E_{\varphi,n+1}(\theta', \varphi)$, respectively. The corresponding beam angle are separated by Δθ equal to the angular spacing of the feeds (as in an idealized Luneburg lens) and have a crossover $G_x$ point that is below the feed beam peaks ($G_b$). In this paper we refer to the beam produced by a single feed element as a basis beam. The n and n+1 feed elements are driven by complex weights $s_n$ and $s_{n+1}$, respectively and are separated by an arc length RΔθ. If the lens is assumed to produce an idealized uniform aperture field distribution at all feed angles the resulting beams are sinc functions versus angle.

Assuming any two feed locations are fixed there is a region with lower gain between each basis beam (referred to as the "null"). To 'fill the null' all N beams may be optimally combined to produce the highest gain at the angle exactly between the two basis beams. This synthesized beam may in fact have higher gain at the null than each basis has individually, and the ratio of the gain of this synthesized beam to $G_b$ is denoted as ΔG. As the physical (or angular) separation between feed n and n+1 increases $G_x$ reduces and filling this null becomes more difficult (FIG. 12B). The mapping from crossover to spacing is shown explicitly in FIG. 12C for a variety of assumed aperture efficiencies ranging from 0.6 to 0.8. For feed spacing out to approximately 0.7λ the gain between two beams may be approximately equal to the gain of the basis beams (at their corresponding angles). If the feeds are closer (e.g., 0.5λ), ΔG (in dB) actually becomes positive. This simplified analysis justifies the sparse feed approach proposed herein. To further justify the approach, FIG. 12C includes the gain crossover points (purple circle markers) from the 0.1λ-spaced horn measurements, confirming the same trends are valid for realistic systems.

One of the embodiments described herein is a method for computing optimal feed weights s for a desired objective (e.g., maximum gain at an arbitrary angle, including between basis beams) based upon measured (or simulated) complex fields (or radiation patterns) from a realized system. Since each feed produces a single basis beam which is scaled by the complex weight of each feed s and the total field is the superposition of all feeds, the resulting electric field in the far-field can be expressed as a vector of complex feed weights multiplied by a lens system matrix, H, $$Hs=e, \tag{1}$$

where H∈C is an M-by-N matrix consisting of electric field measurements at some radius R. There may be M sampled points of (θ,φ) for each of the N antennas $$\theta \in \left[\frac{-\pi}{2}, \frac{\pi}{2}\right], \phi \in [-\pi, \pi].$$

M/2 of the rows represent Eθ and the remaining M/2 represent E. Each column represents the nth basis beam. The N-by-1 s∈C are phasors representing normalized driving point voltages such that s2n is equivalent to input power at the nth feed. Boldface capital letters used herein may denote matrices and boldface lower-case letters may denote vectors. Below is shown an example of this matrix, where the first index refers to θ location and the second to φ. The subscripts indicate field polarization and feed index:

$$H = \begin{bmatrix} E_{\theta,1}(-\pi, 0) & \dots & E_{\theta,N}(-\pi, 0) \\ \vdots & \ddots & \vdots \\ E_{\theta,1}(\theta_0, \phi_0) & \dots & E_{\theta,N}(\theta_0, \phi_0) \\ \vdots & \ddots & \vdots \\ E_{\theta,1}(\pi, 2\pi) & \dots & E_{\theta,N}(\pi, 2\pi) \\ E_{\phi,1}(-\pi, 0) & \dots & E_{\phi,N}(-\pi, 0) \\ \vdots & \ddots & \vdots \\ E_{\phi,1}(\theta_0, \phi_0) & \dots & E_{\phi,N}(\theta_0, \phi_0) \\ \vdots & \ddots & \vdots \\ E_{\phi,1}(\pi, 2\pi) & \dots & E_{\phi,N}(\pi, 2\pi) \end{bmatrix}. \tag{2}$$

The M-by-1 vector e∈C is the resulting total electric field due to a particular array excitation. The matrix in (2) may be referred to as the "H matrix". In some cases M<N columns of the H matrix (feeds) may be selected to form an H submatrix. Such submatrices may also be referred to as H matrices or H unless the distinction is relevant. Two algorithms are presented below to determine the appropriate feed weights s for a high-quality beam at a given steering angle: a "max gain" algorithm generated from constrained optimization theory and a global solver implemented using particle swarm optimization (PSO).

The purpose of max gain algorithm is to find the optimal feed weight vector s which maximizes gain at a particular target angle ($\theta_0$,$\varphi_0$). While it is especially important to achieve maximum gain between basis beams (in the nulls)

the result is valid at all angles including at basis beams. Gain, in terms of the far-field electric field and the feed weights is, $$G(\theta,\phi)=\frac{4\pi U(\theta,\phi)}{P_{in}}=\frac{4\pi U(\theta,\phi)}{\|s\|^2}=\frac{4\pi R^2|E(\theta,\phi)|^2}{2\eta\|s\|^2},\tag{3}$$

where $\|\cdot\|$ denotes the $L_2$ norm.

In (2) there are two rows for a given angle, one for each orthogonal polarization, throughout this document only the $E_\varphi$ component may be considered and thus can operate upon a single row. In order to solve for an arbitrary polarization an appropriate change of coordinates can be made to collapse (2) to a single row for each polarization. The row corresponding to the desired angle and polarization is $h_0$:

$$h_0=[E_{\phi,1}(\theta_0,\phi_0)\ldots E_{\phi,N}(\theta_0,\phi_0)],\tag{4}$$

and $$G(\theta_0,\phi_0)=\frac{4\pi R^2|h_0s|^2}{2\eta\|s\|^2}.\tag{5}$$

Since $4\pi R^2/2\eta$ is a constant, there exist two strategies for maximizing $G(\theta_0,\varphi_0)$: (1) maximizing $|h_0s|^2$ while keeping $\|s\|^2$ constant; or (2) maximizing $\|s\|^2$ while keeping $|h_0s|^2$ constant. And finding the feed weights for maximum gain at the target angle is a constrained optimization problem. In the following the second strategy is pursued. Using the Lagrange multiplier method the field value at the steering angle is constrained to an as-yet-undetermined constant ($k=|h_0s|^2=E(\theta_0,\varphi_0)$) and $\|s\|^2$ is minimized. The Lagrangian of the system is $$\begin{aligned}\mathcal{L}&=\|s\|^2+\lambda(h_0s-k)\\&=s^*s+\lambda(h_0s-k),\end{aligned}\tag{6}$$

which when minimized yields, $$\begin{aligned}\nabla\mathcal{L}&=s^*+\lambda h_0^*\\0&=s+\lambda h_0^*\\s&=-\lambda h_0^*,\end{aligned}\tag{7}$$

where λ denotes the Langrange multiplier (a free parameter) and $(\cdot)^*$ denotes the Hermitian transpose operator. From the equality constraint:

$$k=-\lambda h_0h_0^*,\ \text{and}\qquad \lambda=\frac{-k}{h_0h_0^*}.\tag{8}$$

Substituting (8) into (7) yields:

$$S=\frac{kh_0^*}{h_0h_0^*}.\tag{9}$$

Since k has not yet been chosen, it can be used to cancel the scalar factor of $h_0h_0^*$ in the denominator, yielding the straightforward result:

$$s=h_0^*,\tag{10}$$

which is similar to a conjugate field matching approach except that instead of requiring the fields in the focal plane (often a difficult quantity to measure), this result may require the complex far-fields at the desired angle (a much more straightforward quantity to acquire). In other words, in order to form a beam with the highest gain at a particular angle, not only should the antenna phases be set such that all radiation adds coherently at the angle of interest, but each feed should be excited in proportion to the magnitude of their respective electric field at the steering angle.

The above result uses all available feed elements represented in s but it is often sufficient (and preferred) to use a small subset of feeds in order that the beamformer ICs for inactive feeds can be disabled to reduce static power consumption (see crossed-out beamformer ICs in FIG. 11C). It is now shown that when synthesizing a beam with maximum gain using a subset σ of feeds, with cardinality $|\sigma|<N$ (corresponding to subselected columns of H), the feeds which produce the highest amplitude fields at the desired angle (referred to as the "loudest neighbors") should be used. Inserting (10) into (5) yields the optimal gain in the target direction:

$$\begin{aligned}G_0&=\frac{4\pi R^2\,|\,h_0h_0^*\,|^2}{2\eta\|h_0\|^2}\\&=\frac{4\pi R^2\|h_0\|^4}{2\eta\|h_0\|^2}\\&=\frac{4\pi R^2\|h_0\|^2}{2\eta}=\alpha\|h_0\|^2.\end{aligned}\tag{11}$$

Using (11) and the subset σ:

$$G_{0,\sigma}=\alpha\|h_{0,\sigma}\|^2=\alpha\sum_{m=1}^{|\sigma|}|h_{0,m}|^2,\tag{12}$$

where $h_{0,\sigma}$ denotes $h_0$ truncated to only include the columns corresponding to σ (1-by-$|\sigma|$ vector). Since (12) is a sum of positive numbers: (1) asdf Removing any feed with $|h_{0,n}|$ 6=0 from σ reduces $G_{0,\sigma}$ and (2) Keeping the feeds with highest $|h_{0,n}|$ maximizes the partial sum of (12) and minimizes the reduction of $G_{0,\sigma}$ as feeds are removed. The second observation may be referred to as loudest neighbor selection. It may be optimal for the gain method and a useful heuristic when another synthesis algorithm is employed such as Particle Swarm Optimization (PSO) with FoMs other than maximum gain.

Although the "gain method" described above results in a closed-form expression (and is thus simple and efficient to compute), it possesses some drawbacks, namely: (1) It only optimizes gain and cannot address, e.g., sidelobe levels directly; (2) Although the gain in the direction of the steering angle is guaranteed to be the maximum possible for the set of feeds chosen, the steering angle is not guaranteed to be the angle at which the radiation pattern is maximized (that is, the gain may be higher at other angles).

Figure 13A:
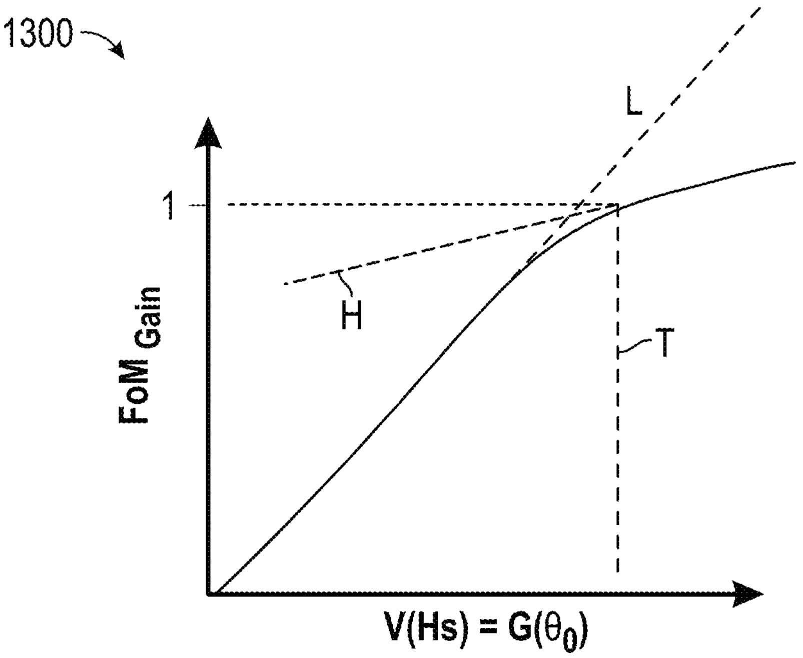
FIG. 13A illustrates an example for gain at a target angle for a phased array antenna in accordance with embodiments of the present disclosure.

Alternatively, a FOM can be defined to describe the desired beam(s) and a global optimizer (e.g. PSO) may be used to solve for the beam weights that produce the highest FoM. To generate the FoM, the desirable aspects of a beam may be considered (see FIG. 13B): (1) high gain ($G(\theta_0)$)/directivity, (2) low sidelobe level (SLL), (3) angle of maximum gain corresponds to desired beam angle ($\theta_0$), and (4) low main-beam width ($\Delta\theta$). Although in practice there may be some correlation between these characteristics, it is convenient to track each of these characteristics independently. A total FoM is $$FoM = \frac{\sum_i w_i f_i(Hs)}{\sum_i w_i}, \tag{13}$$

where the $f_i(Hs)$ denotes an arbitrary function assigning a score to a beam-characteristic-specific FoM and the $w_1$ are scalar weights to assign relative importance. We choose here to define our $f_i$ using integrated sigmoids. Sigmoids are a class of function that are continuous, monotonic, differentiable, and have constant asymptotes. Thus, integrated sigmoids are continuous, monotonic, and differentiable, with linear asymptote:

$$f_i(Hs) = \frac{H-L}{K}\left[\log\left(Ke^{T-V(Hs)}+1\right)\right] + L(T-V) + 1, \tag{14}$$

where V(·) is a functional that maps Hs to a beam characteristic such as Gain and T is the target value of V(Hs). L denotes the asymptotic slope when V(Hs)<T, H denotes the asymptotic slope when V(Hs)>T, and K is a parameter controlling the transition sharpness at T. In general, V (Hs)≥T should represent a good component FoM score. FIG. 13A shows an example of an integrated-sigmoid FoM component curve.

Figure 13B:
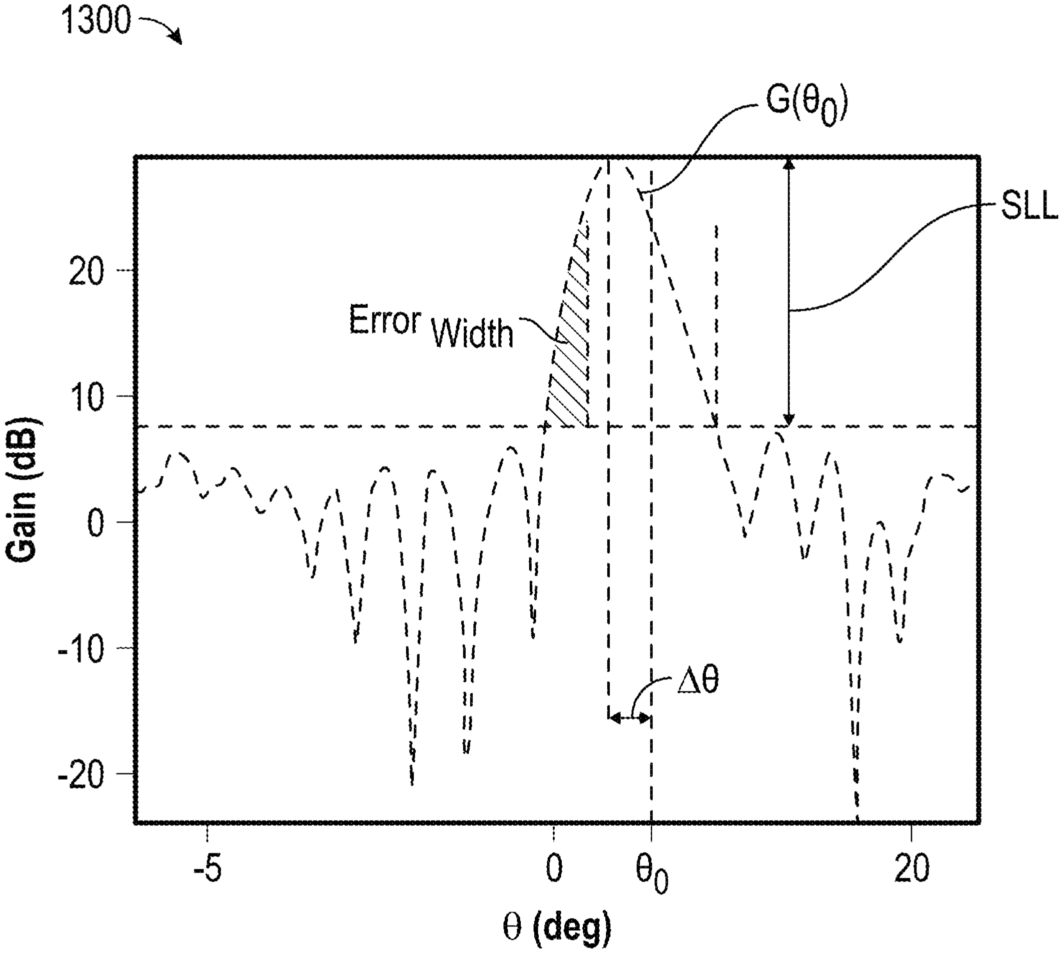
FIG. 13B illustrates a graph showing different component metrics for an FoM in accordance with embodiments of the present disclosure.

FIG. 13A shows integrated sigmoids used to assign a score for each component of the composite FoM. Shown here is an example for gain at the target angle. The component FoM has a constant slope (L) up until around the target gain (T), at which point the slope transitions to another constant slope (H). The sharpness of this transition (K) may be configured as well. FIG. 13B shows a full FoM that considers several individual 'component' metrics, such as gain at the steering angle ($G(\theta_0)$, SLL, beam angle ($\Delta\theta$), and the width of the main beam $error_{width}$. In order to evaluate a scalar value for $error_{width}$, the main beam radiation above the desired SLL is integrated in a chosen angular extent around the steering angle. Each may be a function returning a scalar from the synthesized fields.

V(Hs) and T are defined for each component FoM. With reference to the four desirable quantities of beams above (and FIG. 13B): (1) High gain: V(Hs) and T are defined logarithmically—T is at or above the basis gain; (2) Low SLL: V(Hs) is the difference in logarithms between the global gain peak and the highest sidelobe peak. T is generally set from −10 to −15 dB; (3) Max gain angle: V(Hs) is the angle of the beam pattern maximum. T is the desired beam angle; and (4) Low beam width: V(Hs) is the integral of the logarithmic gain above a threshold (here the SLL threshold) in an angular region excluding the desired beam width. T is zero.

These FoMs will be referred to as $f_{gain}$, $f_{SLL}$, $f_{angle}$, and $f_{BW}$ for notational consistency with (14). Their corresponding weights are referred to as $w_{gain}$, $w_{SLL}$, $w_{angle}$, and $w_{BW}$. $f_{gain}$ was assigned an H of 0.2 to allow for unlimited gain improvement and all other $f_i$ had H=0. For all optimized beam weights, the MATLAB particleswarm function (from the Global Optimizer Toolbox) was used, although many particle swarm implementations exist. As the solver cannot operate directly on a search space defined by complex numbers, the N complex feed weights for optimization are passed in as 2N real weights corresponding to the real and imaginary components of each feed. Moreover, since the particleswarm solver anticipates minimizing a function rather than maximizing it, all FoMs are inverted prior to evaluation. Convergence is aided by seeding half of the particles within a 2N-dimensional sphere centered at the solution of the max gain solver, which reduces the number of iterations by a factor of 2. More sophisticated strategies for improving optimizer efficiency may be used for tractable lens-array codesign.

Figure 14A:
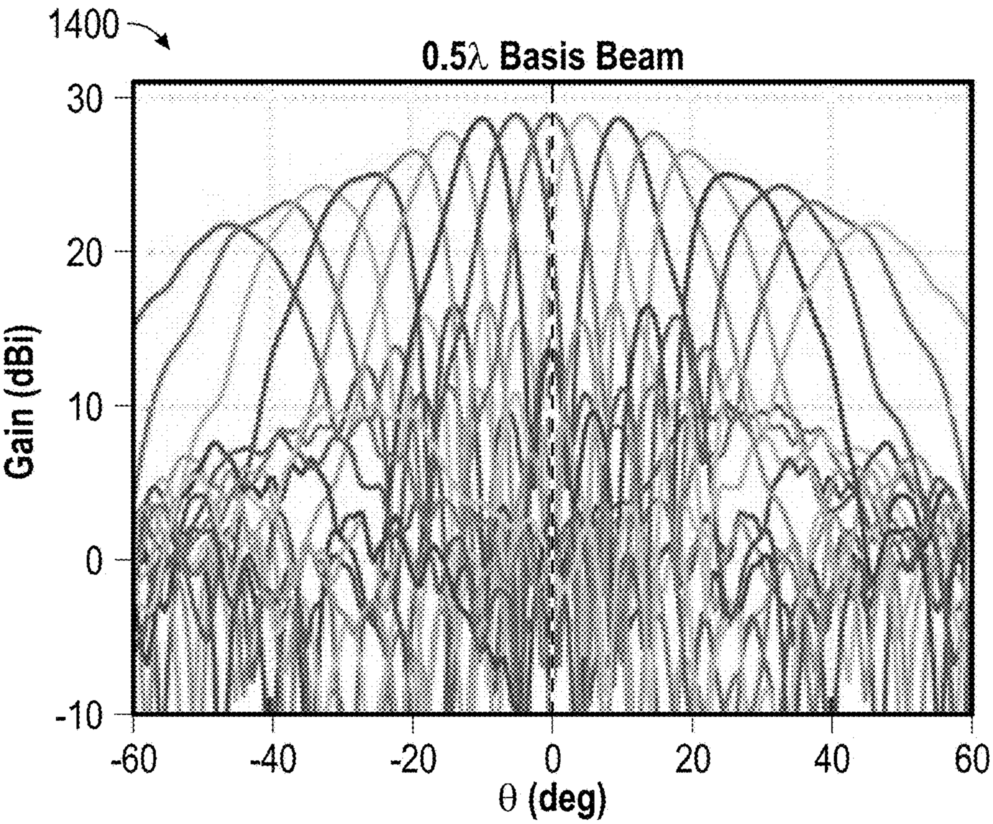
FIGS. 14A-C illustrate example basis beams for an SPAFL antenna in accordance with embodiments of the present disclosure.
Figure 14B:
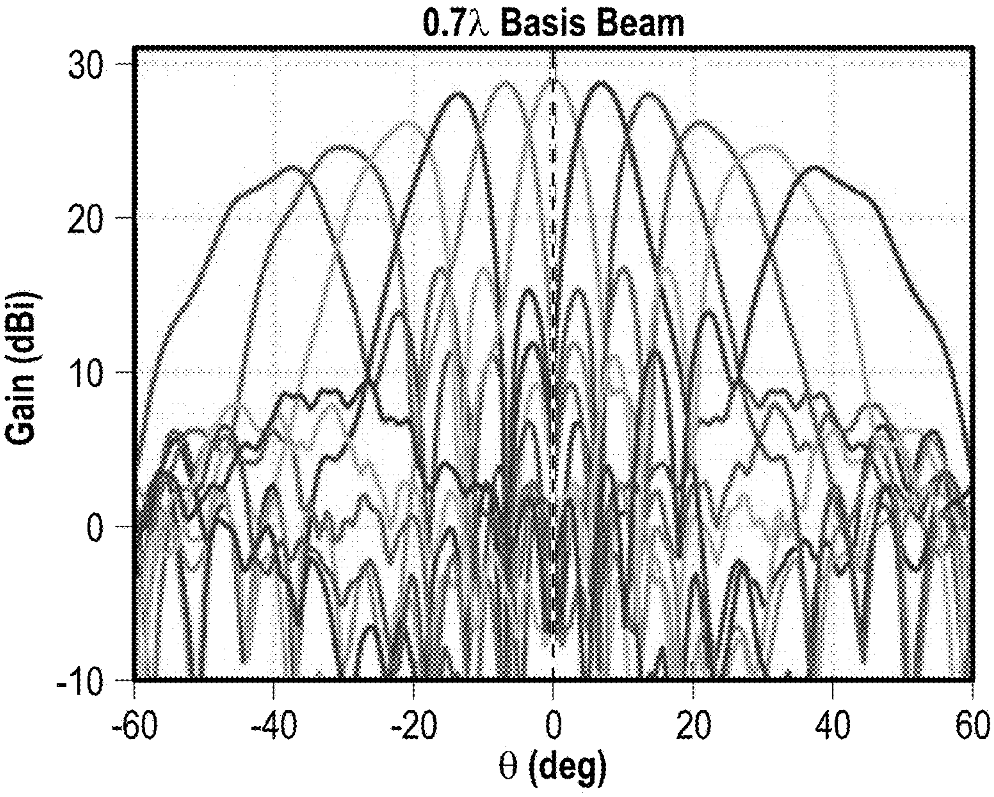
Figure 14C:
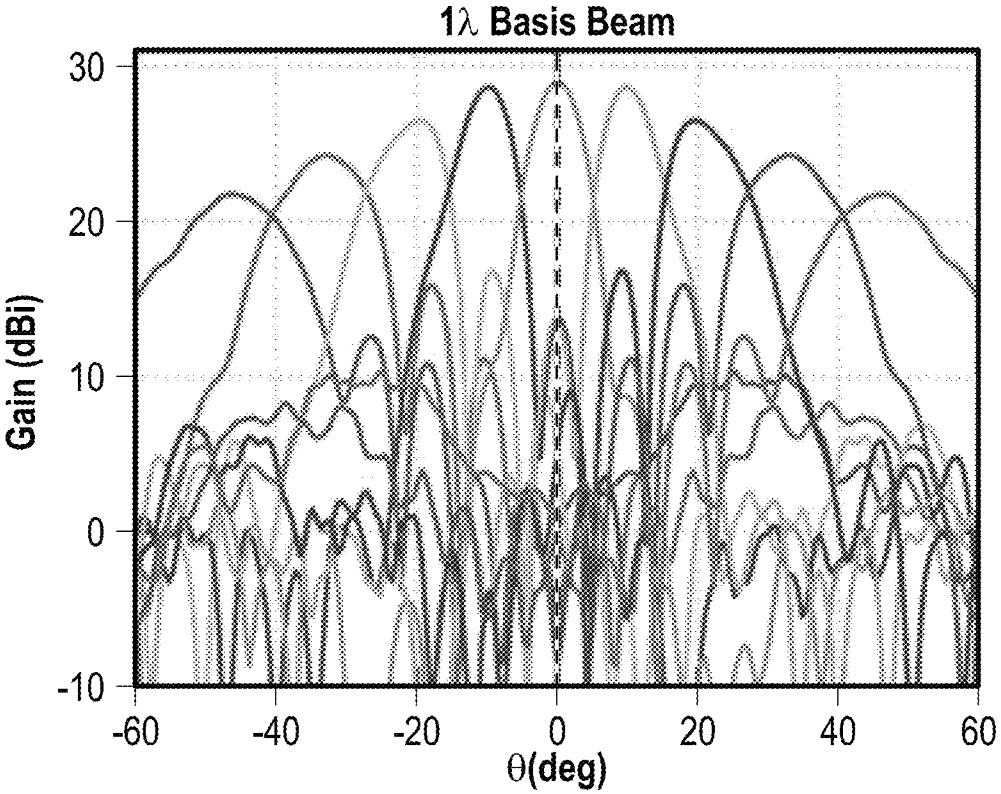

Theoretical results were validated using a 4"-diameter planar GRIN lens. First the gain-reduction versus feed spacing from the simplified model (FIG. 12C) was be confirmed. To obtain the basis beams for a variable-spacing feed array, the fields from the lens were measured with a WR28 10 dBi standard gain horn antenna operating at 27 GHz. The horn feed was translated across the lens in steps of 0.1-λ from the lens center to the edge of the lens. The complex basis beam far-fields were calculated from an NSI-MI near field scanner with an angular coverage up to 60° from broadside. A full edge-to edge set of basis beams was created by assuming symmetry across the lens center. The tight spacing on measured beams allowed better investigation of the effect of array spacing on beam quality (specifically d=0.5λ, d=0.7λ, and d=2, as shown by FIGS. 14A-L and inspired by the results of FIG. 12C). The measured basis beams are shown in FIG. 14A-C. This system has high quality near-broadside basis beams, exhibiting −20 dB SLL. Beam quality noticeably degrades over scan with farther-out beams exhibiting reduced gain, larger beamwidth and reduced SLL. The scan-loss exponent of the basis breams is 5.0.

Figure 14D:
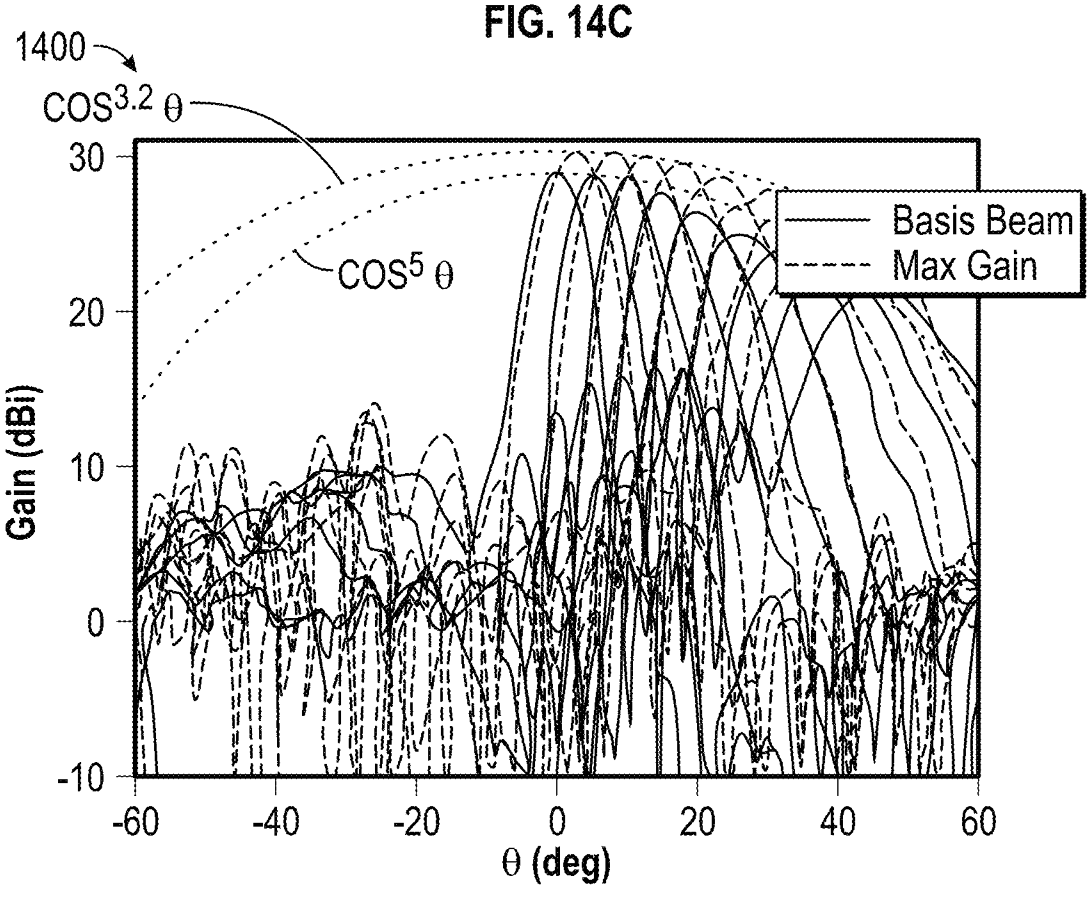
FIGS. 14D-F illustrates example null filling performance in accordance with embodiments of the present disclosure.
Figure 14E:
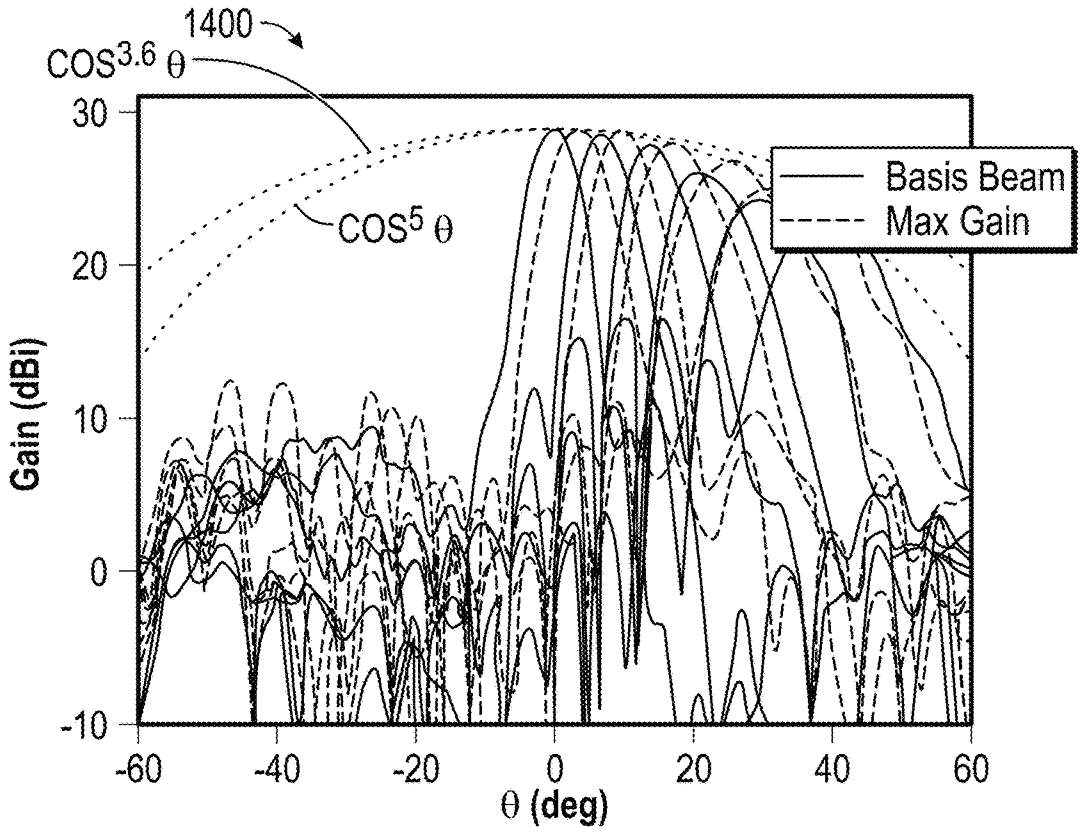
Figure 14F:
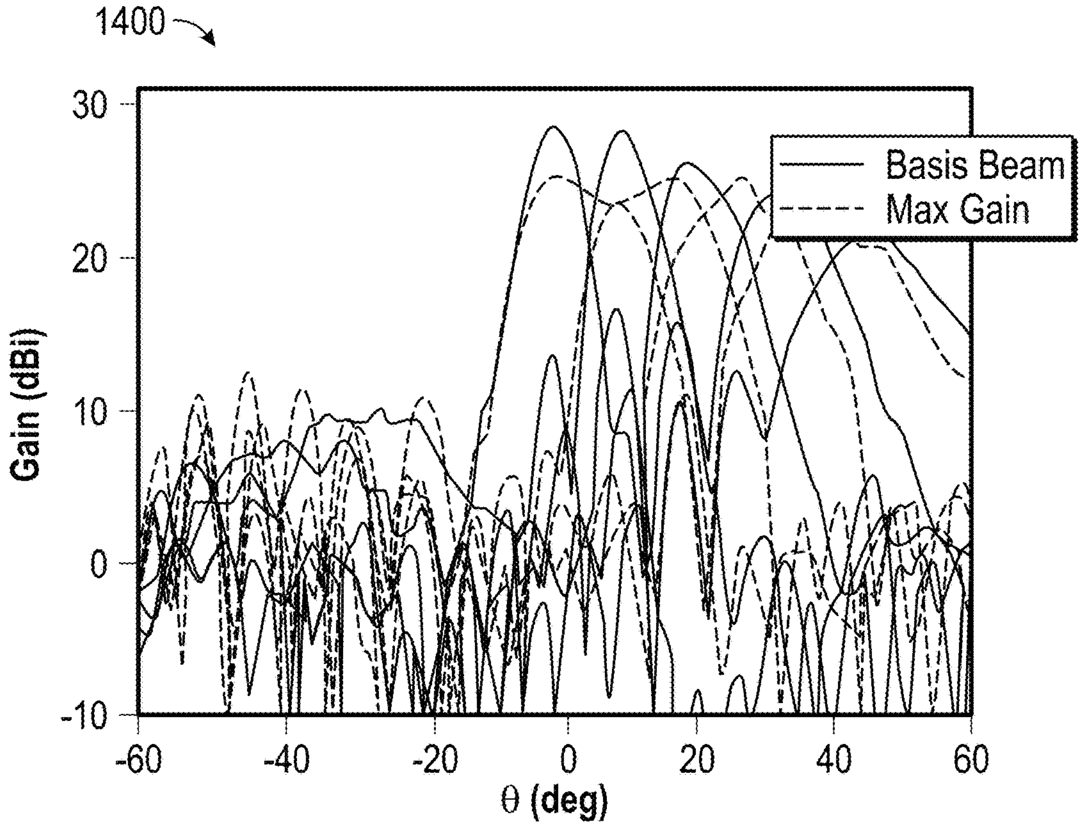
Figure 14G:
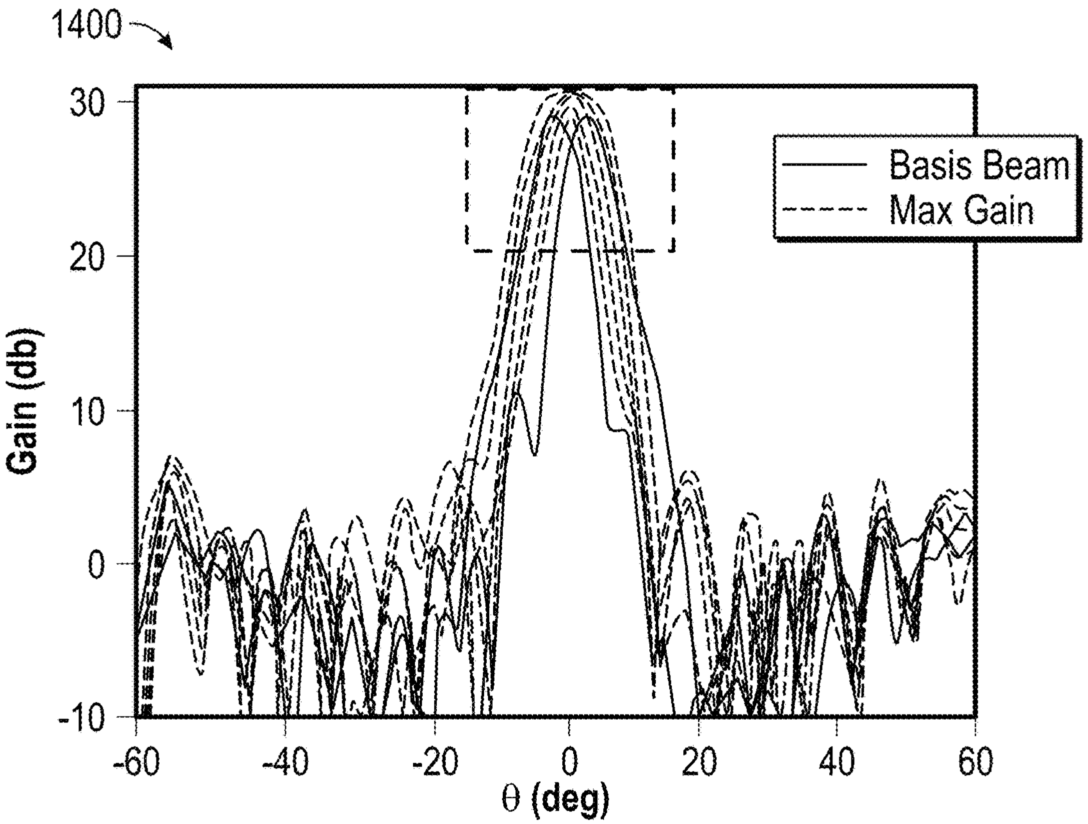
FIGS. 14G-I illustrates example beam-scanning near broadside in accordance with embodiments of the present disclosure.
Figure 14H:
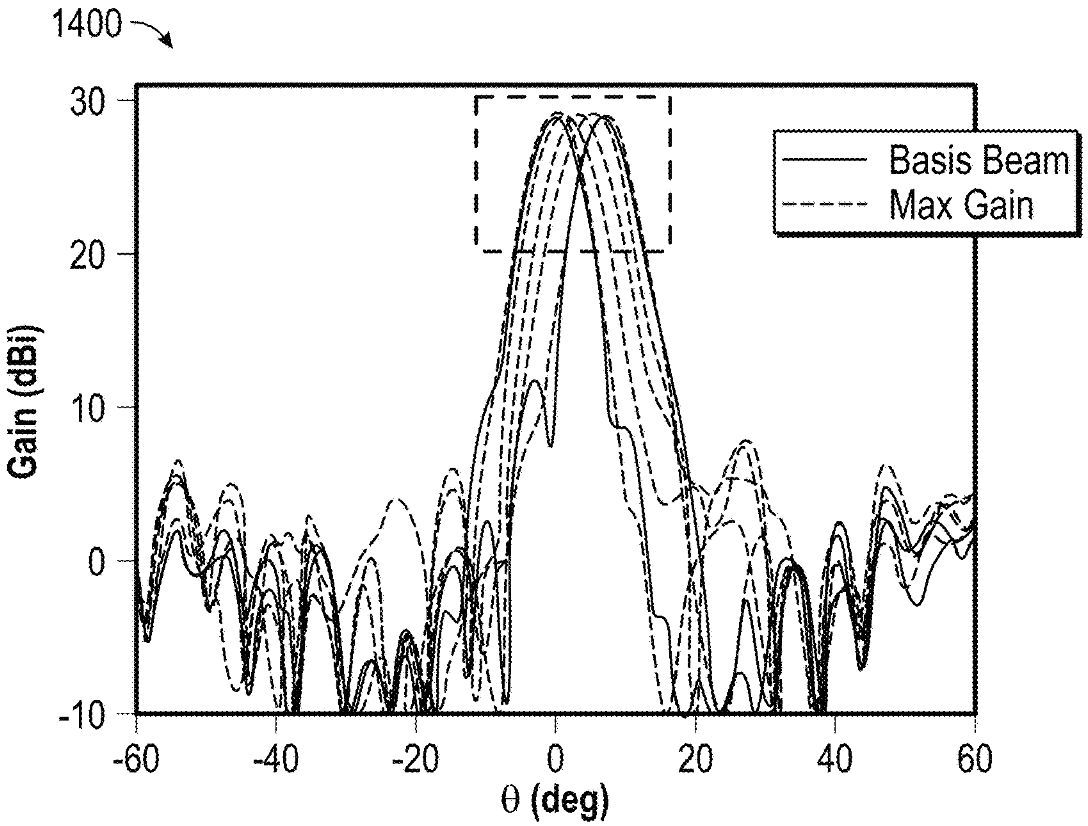
Figure 14I:
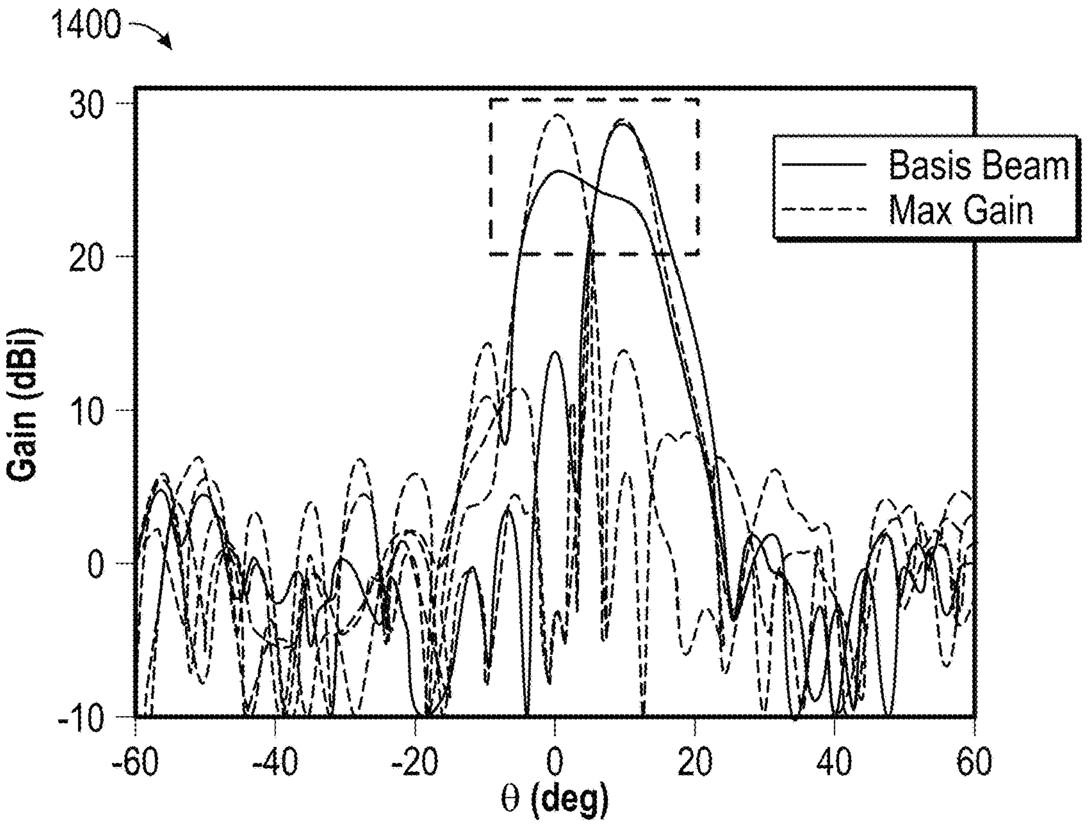

FIGS. 14A-L show beamforming results for uniform linear arrays with three inter-element spacings: 0.5λ in first column, 0.7λ the second column, and 1λ in the third column. The basis beams are shown in FIGS. 14A-C. Perfect symmetry in the bases is observed because beams steered to negative θ were obtained by reflecting beams across θ=0. Closer array spacing corresponds to greater overlap between beams. FIGS. 14D-F demonstrate null filling performance of the 'gain method' out to a $\theta_0$=40°. For the 0.5λ and 0.7λ arrays, 'null-steered' beams exhibit equal or greater gain than the original bases, and the beam scan exponent is reduced significantly. FIGS. 14G-I show beam-scanning near broadside, and FIGS. 14J-L zoom in on the peaks of FIGS. 14G-I. Note that the 1λ-spaced beams show significant gain reduction within the null. Moreover, due to poor beam shape, the gain solver is unable to satisfy the beam-steering requirement, with the maximum gain of synthesized beams observed at $\theta_{max}$ 6=$\theta_0$ (see the 5° beam).

FIGS. 14D-L shows the null-filling results for each array spacing. Using the gain method, we synthesize maximum gain beams only at the nulls from θ=0° to the edge beams, shown in FIGS. 14D-F. Even though beams are formed at the 'worst-case' locations, the beams synthesized by the 0.5λ and 0.7λ arrays show better gain and lower scan loss than the bases. Specifically, the $\cos^5(\theta)$ scan loss of the bases go to $\cos^{3.2}(\theta)$ for the 0.5λ array and $\cos^{3.6}(\theta)$ for the 0.7λ array. Note the poor quality and low gain of the 1λ array beams, as expected from FIG. 12C.

Figure 14J:
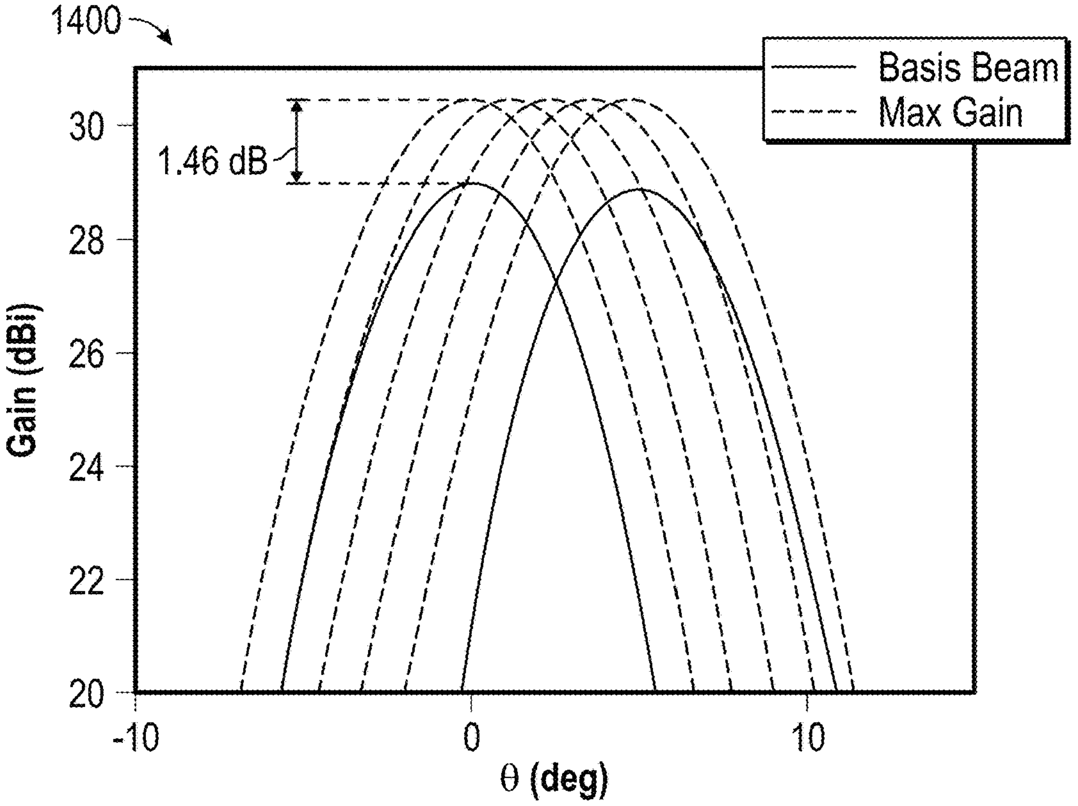
FIGS. 14J-L illustrates zoomed in on the peaks of FIGS. 14G-I in accordance with embodiments of the present disclosure.
Figure 14K:
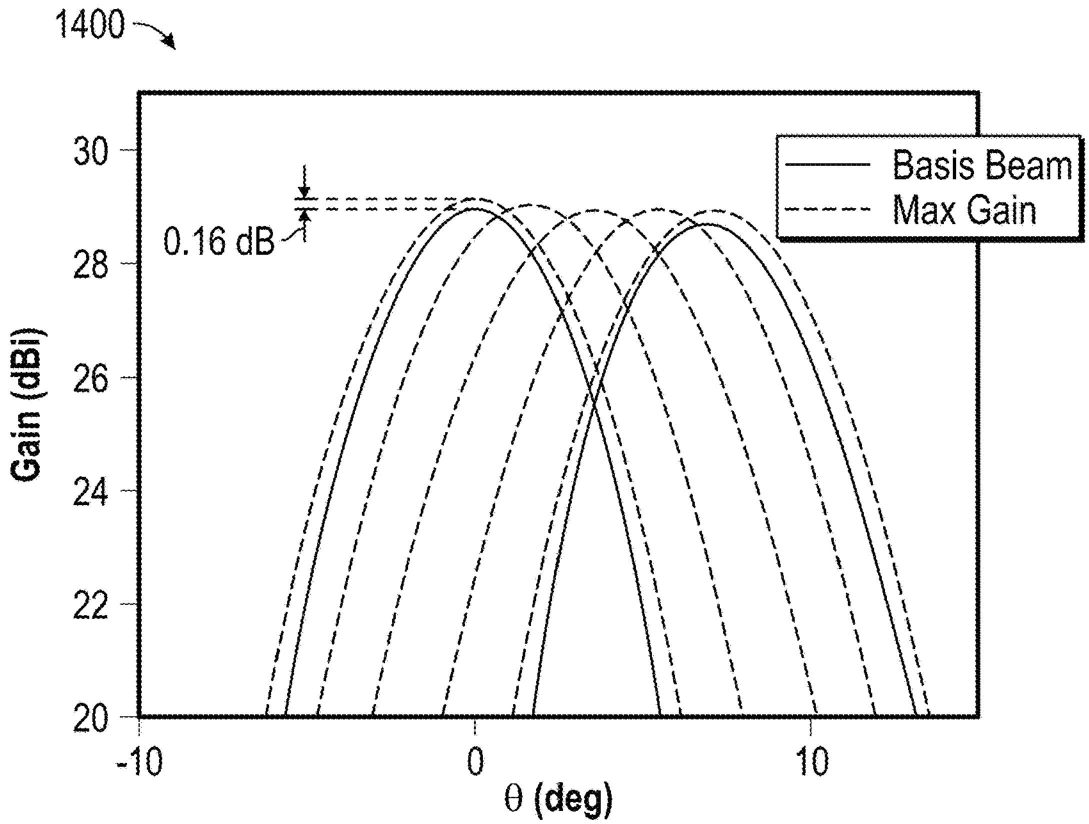
Figure 14L:
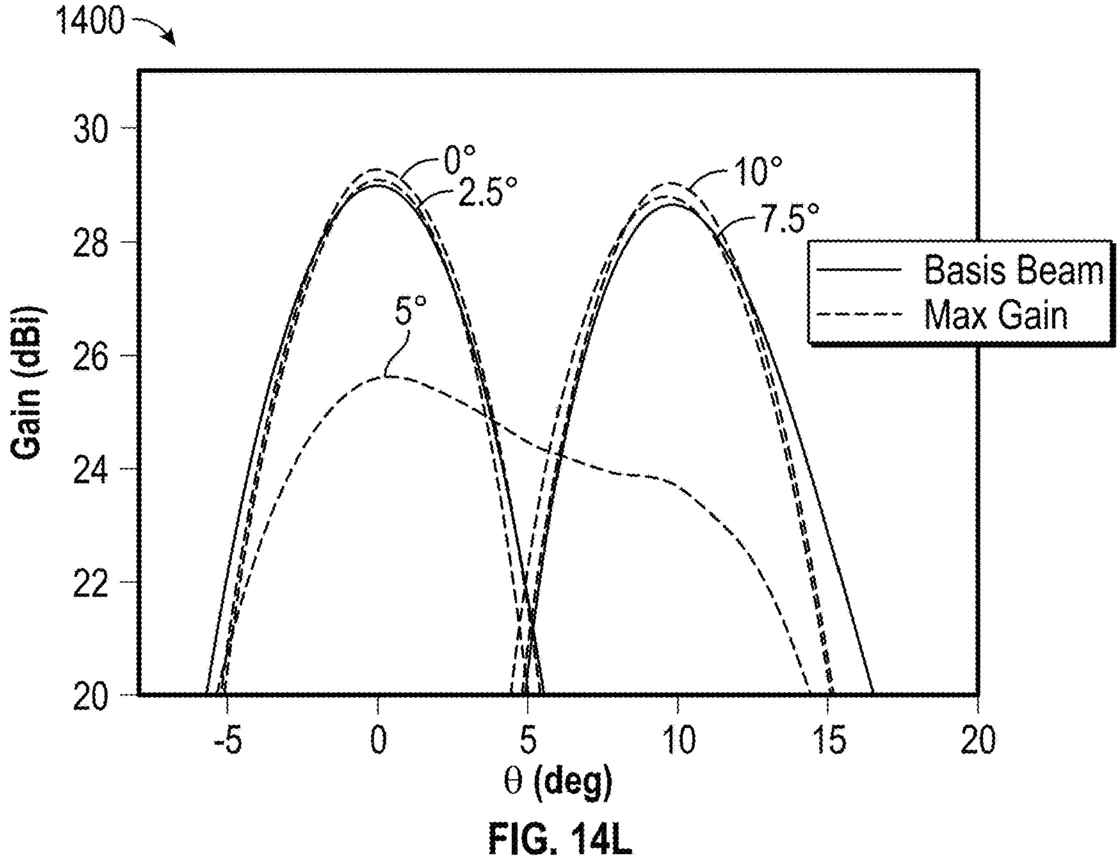

To better visualize beam quality and achievable gain between basis beams, only near-broadside beams are synthesized in FIGS. 14G-L, that is, between the broadside beam at θ=0 and the next closest basis beam. For the 0.5λ and 0.7λ arrays (FIGS. 14G and 14H), the synthesized beams attain higher gain than their respective basis beams while retaining extremely low sidelobe level (SLL<−20 dB). For the 1λ array (FIG. 14F), achievable gain at the null angle is in fact greater than that achievable by any single basis at that angle, but the null beams do not have gain commensurate with the bases and exhibit poor quality. FIGS. 14J-L are zooms of the peaks of FIGS. 14G-I, respectively. The 0.5λ synthesized beams have an additional 1.46 dB of gain compared to the basis beams, and the 0.7λ synthesized beams can fill the null with only marginal improvement in gain at the broadside basis (0.16 dB). For the 1λ array (FIG. 14K), the beams synthesized exhibit either severe degradation within the beam null or exhibit the artefact where the maximum gain of the entire pattern does not coincide with the steering angle.

Figure 15A:
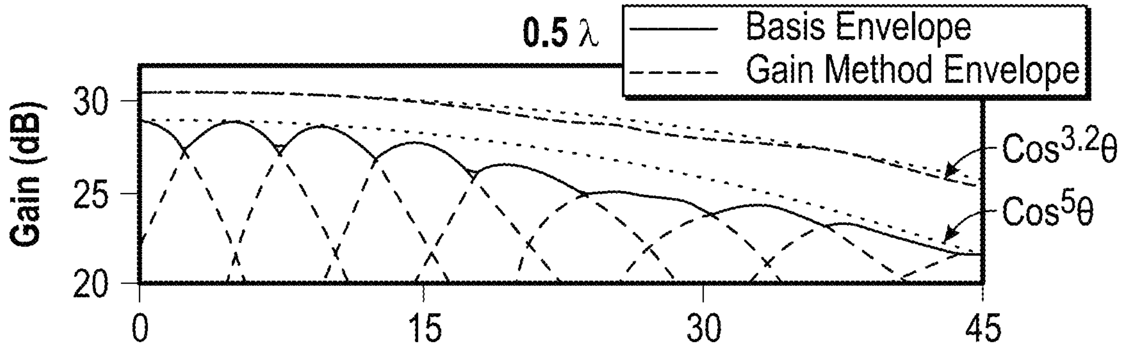
FIGS. 15A-C show example basis beams, basis beam envelope, and synthesized beams in accordance with embodiments of the present disclosure.
Figure 15B:
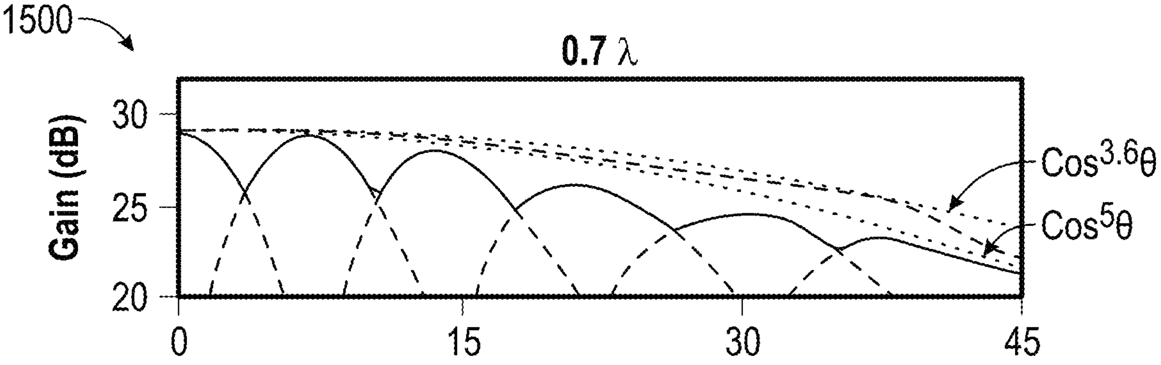
Figure 15C:
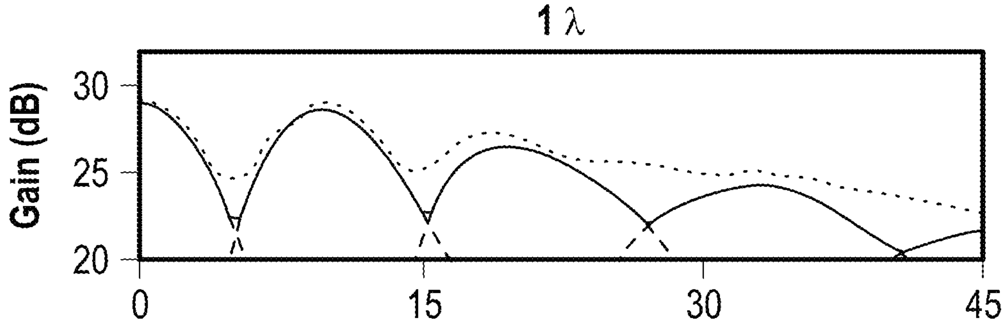

FIGS. 15A-C show basis beams (dashed gray traces), basis beam envelope (solid black), and synthesized beams using the gain method for 0.5λ- (solid orange), 0.7λ- (dashed orange), and 1λ-spaced (dotted orange) spacing. The basis envelope exhibits gain ripple due to nulls between fixed basis beams. For 0.51 spacing, a >1.5 dB gain improvement is achieved over all scan angles, and rolloff improves from $\cos^5\theta$ to $\cos^{3.2}\theta$. For 0.7λ, both benefits are less dramatic, with an improved scan loss of $\cos^{3.6}\theta$. 1λ spaced feeds exhibit gain ripple due to deep nulls between basis beams.

Figure 15D:
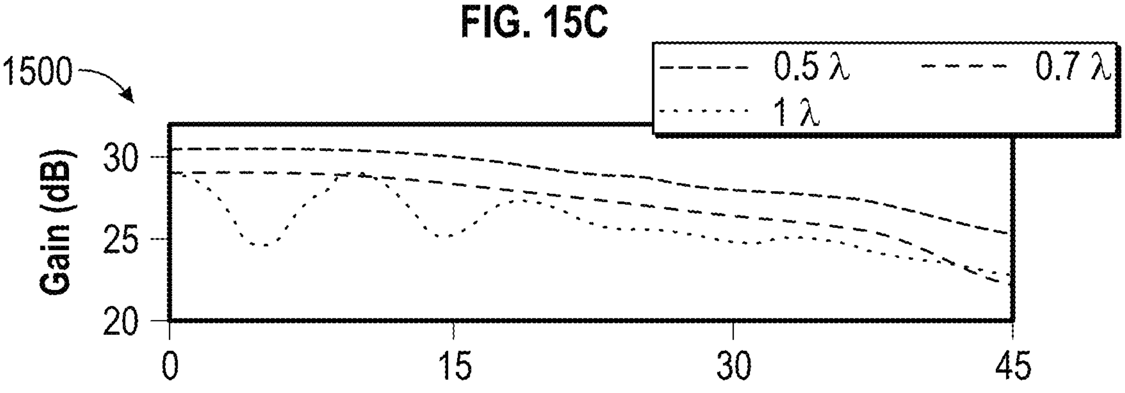
FIG. 15D illustrates example results for different feed array spacings in accordance with embodiments of the present disclosure.

FIGS. 15A-D show the peak gain achievable at any given steering angle from 0°-45°. For comparison, the maximum gain at each steering angle due to excitation of a single basis beam is also shown. For all three spacings, the basis beam envelopes are lower than synthesized beam envelopes with ripples representing nulls. FIG. 15A shows the improved scan loss of $\cos^{3.2}\theta$ for 0.5λ spacing and FIG. 15B shows the improved scan loss of $\cos^{3.6}\theta$ for 0.7λ spacing. For the 1λ spacing of FIG. 15C, the synthesized gain envelope follows the basis nulls for low beamscan, but can eventually fill the nulls for large scan angle due to the relatively high crossover of the far basis beams. FIG. 15D directly compares the gain envelope for the three feed spacings, indicating a tradeoff between power consumption and maximum gain.

Figure 16:
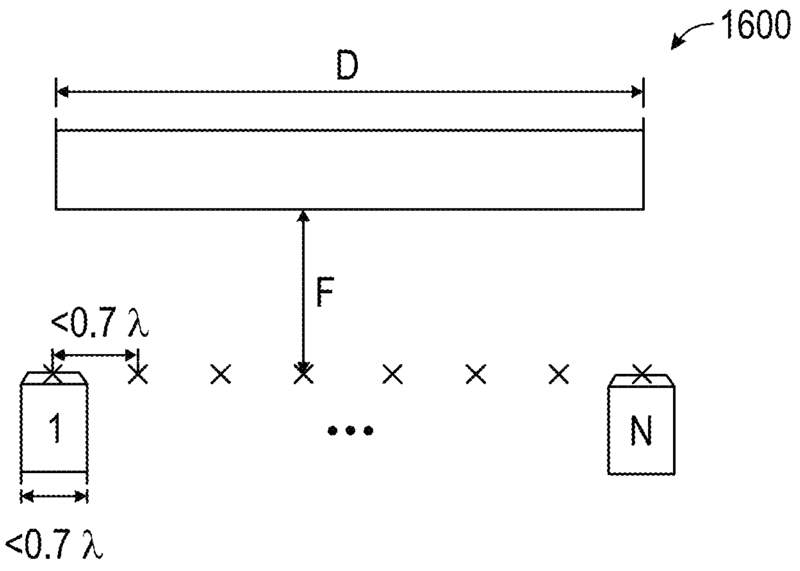
FIG. 16 illustrates a schematic of full-wave simulation showing an OEWG feed array behind a GRIN lens profile in accordance with embodiments of the present disclosure.

To demonstrate the general applicability of the gain method to flat lens systems, two additional GRIN designs were investigated from A. Papathanasopoulos, Y. Rahmat-Samii, N. C. Garcia, and J. D. Chisum, "A novel collapsible flat-layered metamaterial gradient refractive-index lens antenna," *IEEE Trans. Antennas Propag*., vol. 68, no. 3, pp. 1312-1321, 2020 and a F/D=0.5 version of S. Zhang, R. K. Arya, W. G. Whittow, D. Cadman, R. Mittra, and J. Vardaxoglou, "Ultra-Wideband Flat Metamaterial GRIN Lenses Assisted with Additive Manufacturing Technique," *IEEE Trans. Antennas Propag*., pp. 1-1, 2020. The F/D reduction was necessary for the latter design because the original prescribed F/D exhibited a severely reduced field of view. The F/D=0.5 version was generated with the same design equations and broadside gain was confirmed to be in agreement with the reported value. Neither were designed for beam-scanning performance, and therefore have significant scan loss. An FDTD full-wave simulator (Empire XPU) was used to simulate the basis beams using a practically realizable open-ended waveguide (OEWG) feed array as shown in FIG. 16. The lens was also simulated using an OEWG array for easier comparison in performance improvement with gain solvers. Table I describes the details for these lens simulations. Due to F/D and feeding differences between the simulated and published lenses, the results shown here are purely for illustrating the potential improvement from using the beamforming methods proposed in this work and are not necessarily indicative of the full performance capabilities of these lenses as originally designed.

FIG. 16 shows a schematic of full-wave simulation showing an OEWG feed array behind a GRIN lens profile. The OEWG width is less than 0.7λ for all cases to fit 0.7λ spacing. Only two edge feeds are shown for brevity. Details regarding the simulations can be found in Table I.

TABLE I

DETAILS FOR THE LENS SIMULATIONS FROM LITERATURE, AS SHOWN IN FIG. 6

| | As simulated in this work | | | | | | | | As originally published | | | |
|---|---|---|---|---|---|---|---|---|---|---|---|---|
| Lens | F (λ) | D (λ) | F/D | Freq (GHz) | # of feeds | OEWG | rolloff | rolloff (PAFL) | F (λ) | D (λ) | F/D | Feed |
| [18] | 4.3 | 9.0 | 0.5 | 26.5 | 14 | WR-28 | $\cos^6(\theta)$ | $\cos^4(\theta)$ | 4.3 (26.5 GHZ) | 9 | 0.5 | Horn |
| [26] | 2.5 | 5.0 | 0.5 | 12.4 | 8 | WR-62 | $\cos^5(\theta)$ | $\cos^4(\theta)$ | 20 (40 GHZ) | 16 | 1.25 | OEWG |
| [19] | 2.4 | 4.1 | 0.6 | 12.4 | 8 | WR-62 | $\cos^{4.5}(\theta)$ | $\cos^3(\theta)$ | 3 (13.4 GHZ) | 5 | 0.6 | Patch |

Figure 17A:
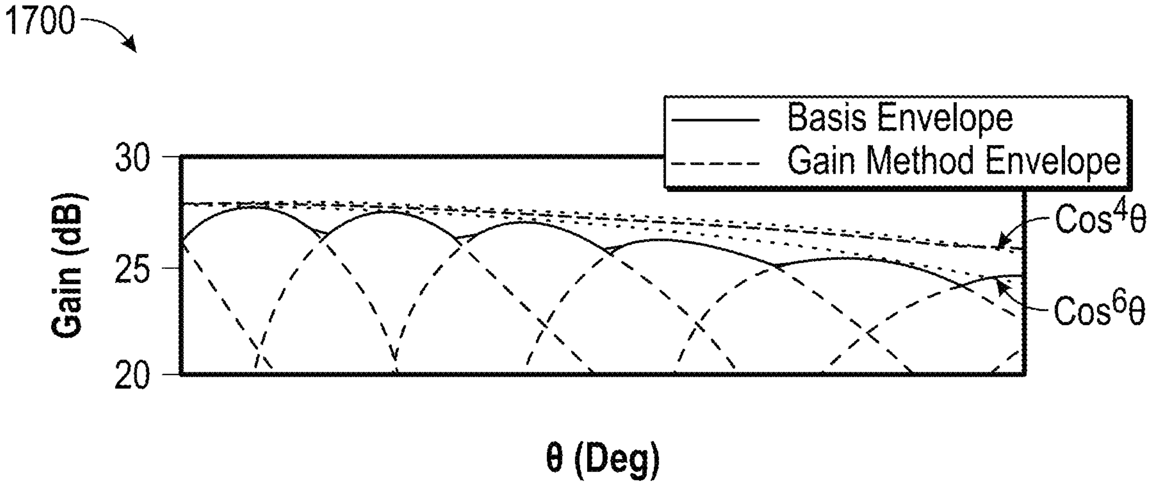
FIGS. 17A-C illustrate beamscan performance using the proposed gain method for various lenses in accordance with embodiments of the present disclosure.
Figure 17B:
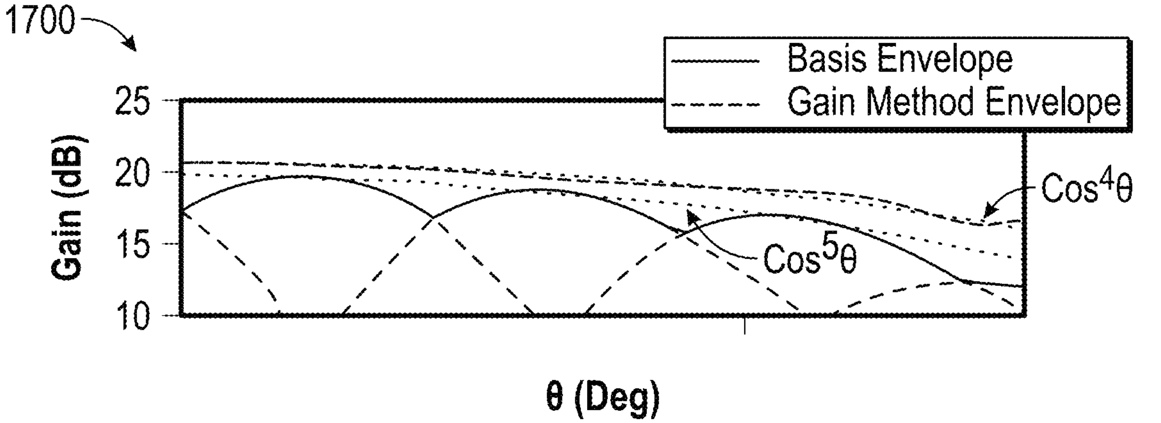
Figure 17C:
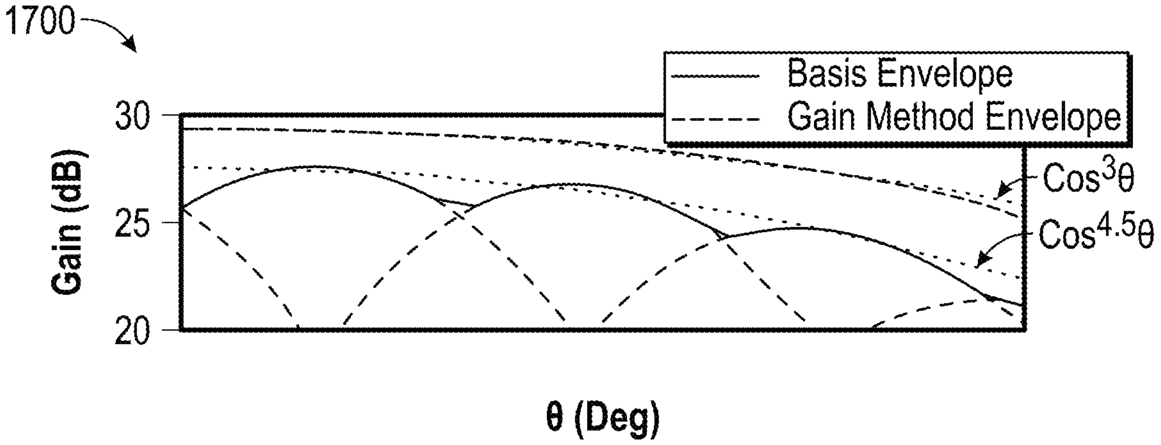

FIGS. 17A-C show improvement in beamscan performance using a gain method for various lenses. For all cases the cosine scan loss exponent improves by 1-2. Lenses are excited by OEWGs as opposed to horn antennas, which is responsible for the different rolloff exponents between FIG. 17A and FIGS. 14A-L. FIGS. 17A-C show substantial improvement in scan loss is possible for all lenses and approximately consistent with up to 1.8 dB improvement at broadside and reduction in the empirical cosine-rolloff exponent of up to n→n−2. This corresponds to a gain improvement of up to 4 dB in the case of [17] at 40°.

Figure 18A:
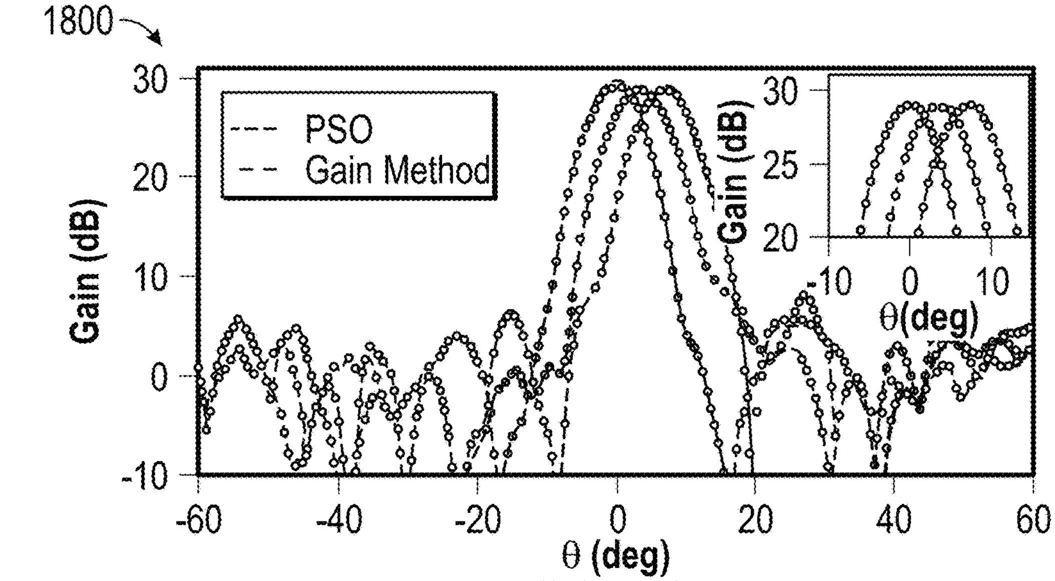
FIGS. 18A and 18B illustrate a comparison of synthesized beams at 0.7λ spacing and multi-objective PSO beam synthesis which heavily weights sidelobe level in accordance with embodiments of the present disclosure.
Figure 18B:
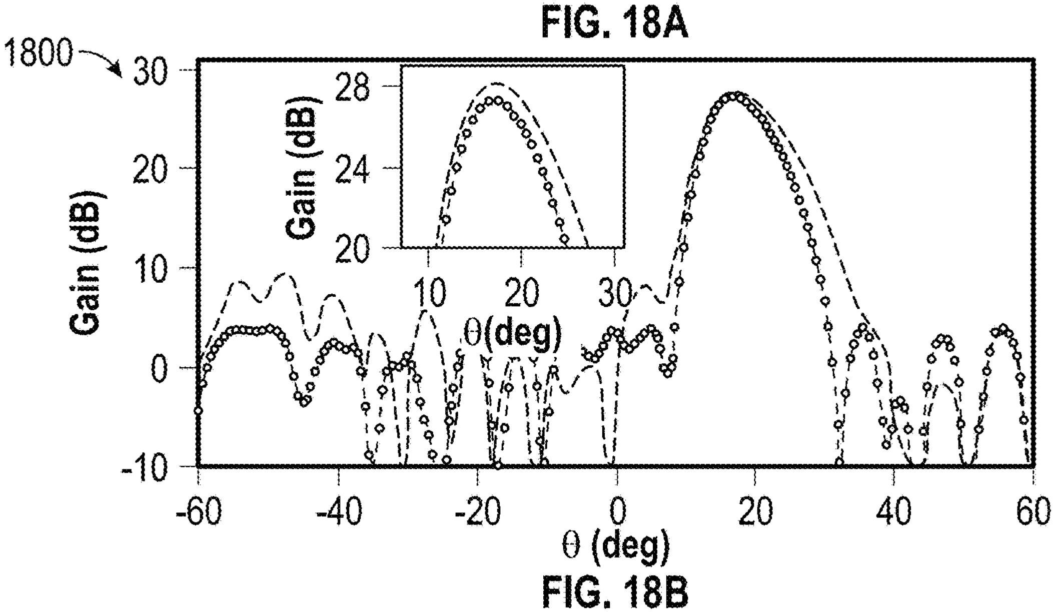

FIGS. 18A-C show a comparison of synthesized beams at 0.7λ spacing using PSO (solid blue with filled circle marker) and the maximum gain method (solid violet). FIG. 18A shows that when the PSO method is used with a gain-dominated FoM the PSO beam shape and peak gain values agree well with the maximum gain method for all angles. FIG. 18B shows a multi-objective PSO beam synthesis which heavily weights sidelobe level and beamwidth results in 0.7 dB less gain than the maximum gain method but with a narrower beam having lower sidelobes at the desired beam angle of 18°.

Although the previous results were all achieved using the gain method, PSO provides far greater control over the beam patterns. As discussed herein, the overall FoM has four components. If $w_{gain}$ is relatively large and dominates other FoMs, the PSO results agree almost perfectly with the gain method as seen in FIG. 18A. Notice that even the sidelobes exhibit very good agreement confirming both the PSO and amximum gain methods. However, if either $f_{SLL}$ or few are relatively highly weighted, the synthesized PSO and gain method beams will differ (as they must in order to satisfy multiple objectives). FIG. 18B shows a multiobjective application of PSO. The reference beam is from FIG. 14E for an 18° target with a target 3-dB beamwidth of 9.6° and SLL of 20 dB. By assigning larger weights for SLL and beamwidth, the PSO-synthesized beam achieves a 3-dB beamwidth of 8.3° and SLL of 23 dB. with 0.7 dB gain reduction (relative to the maximum gain solution) and a slight target angle misalignment. Overall, the result shows the feasibility of PSO in practical beamforming synthesis. In practice, if a more precise beam angle is required $w_{angle}$ may be increased without significant degradation in the other FoMs of the resulting beams.

Figure 19:
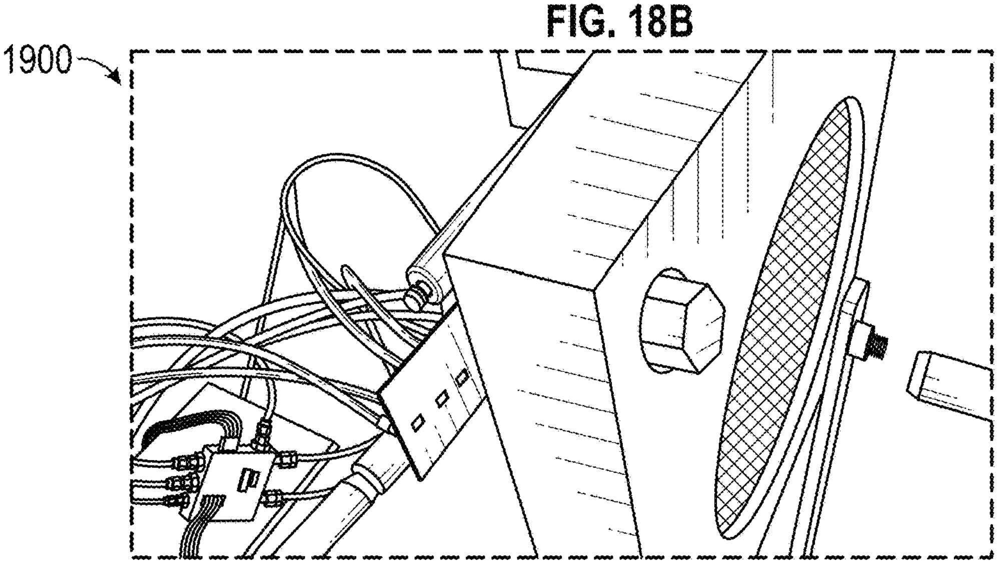
FIG. 19 illustrates a photograph of an example system in accordance with embodiments of the present disclosure.
Figure 20A:
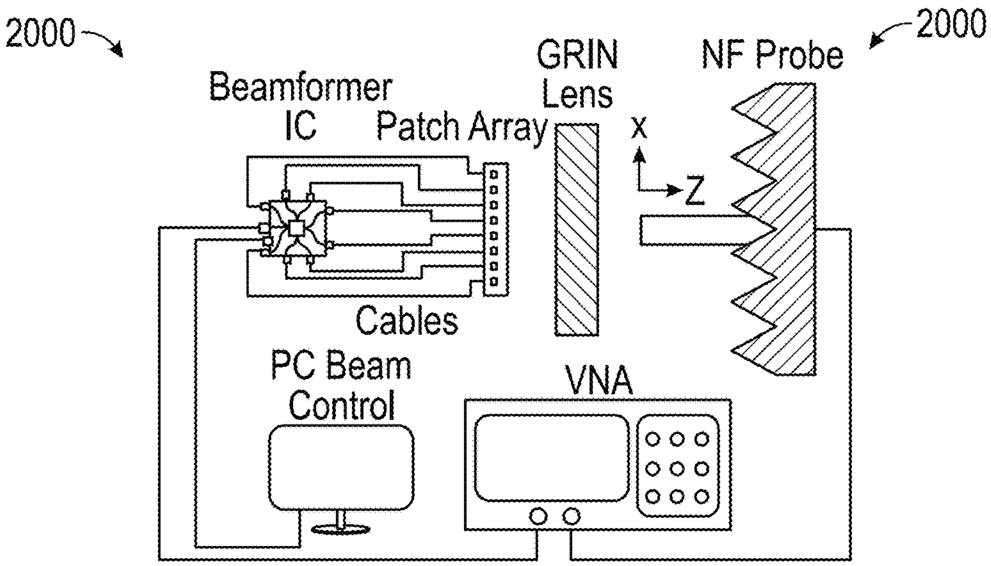
FIGS. 20A and 20B illustrate example test setups in accordance with embodiments of the present disclosure.
Figure 20B:
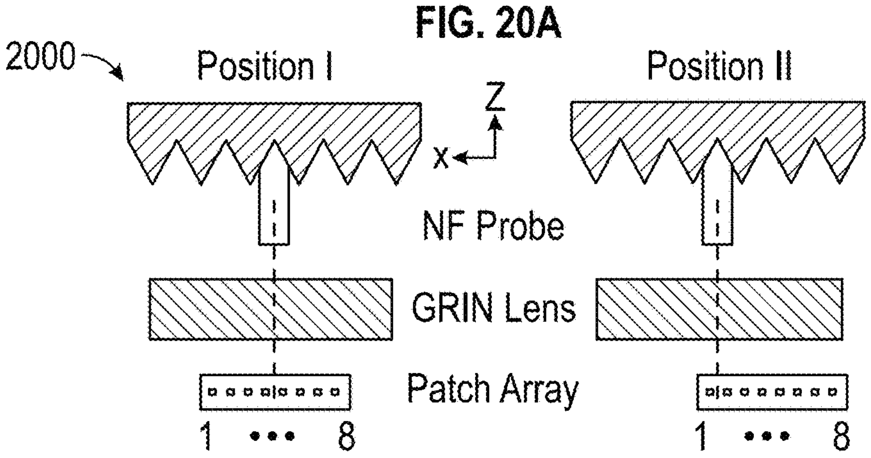

FIG. 19. Photograph of the measured system comprising an 8-element 30 GHz patch array feeding a flat GRIN lens antenna. An 8-channel Ka-band SATCOM transmit beamformer IC drives complex weighted signals to the feed array. FIG. 20A shows a measurement setup for an array-fed 4" lens antenna. A beamforming IC splits the incident RF input signal and provides independent complex-weighted outputs to an 8-element patch array operating at 29 GHz with elements spaced at 0.725λ. The patch array is located at the focal plane of the lens for phase collimation, and the collimated beam is measured by an NSI-MI planar near field scanner. FIG. 20B Basis beam measurement setup. Since the lens is 10λ in diameter and the patch array is only 5.075λ wide, two array locations are used for basis beam generation across the field-of-view.

To validate the simulated results, an 8-element 0.725λ spaced linear patch array operating at 29 GHz with 5 dBi directivity per feed was fabricated. The 4" lens was fed with the array at its approximate focal plane using one of two positions depending on the steering angle, as shown in FIG. 19 and depicted schematically in FIGS. 20A and 20B, with around 27 dBi directivity at broadside. An active 8-channel IDT F6502 beamforming IC evaluation board with 8 bits of gain control and 6 bits of phase control to set the complex beam weights. It was confirmed that quantization errors (due to limited number of bits) had a minimal effect on the resulting beams.

The theoretical results assume that all feed elements are identical. For any practical (non-ideal) system a calibration is necessary to account for antenna loss and imbalances between transmit channels. Equation (1) can be rewritten as, $$e=H(\varepsilon \circ s), \tag{15}$$

where ε is a column vector representing per-channel voltage loss and ° represents the Hadamard product. Due to the imbalance in channels, using the maximum gain method could result in undesirable beam patterns. Since we are ultimately interested in beam patterns, we use directivity instead of gain as the metric of choice. It can be shown that maximizing the metric is equivalent to maximizing directivity (for uniform sampling of the radiating sphere in solid angle), and furthermore, that the solution to the above using the method of Lagrange multipliers is given by $$s_{opt,d} = (H^*H)^{-1}h_0, \tag{17}$$

Although one could directly use (17) for the calculation, the gain method is substantially faster than the directivity method (O(N) vs.~O(NM$^2$), where N is the number of antennas and M the number of rows corresponding to sample points on the radiating sphere). This would be particularly important for lens/array co-optimization approaches in which the optimal weights must be computed for any candidate lens design. In order to make the gain method suitable for solving for directivity, the gain metric should be a maximum at $s_{opt,d}$. If this is true, both algorithms will return the same weights and thus the resulting beams will be identical. This can be satisfied by assuming there exists an $H^0$ that, when given to the gain method will return $s_{opt,d}$:

$$s_{opt,g}'=h_0'=(H^*H)^{-1}h_0^*=s_{opt,d}. \tag{18}$$

Solving for $H^0$ and making the substitutions that $h_0=g^TH$ and $h_0'=g^T H'$, where g is a column vector that consists of all zeros except for the index corresponding to the row denoting the beam steering angle and $[\cdot]^T$ denotes the matrix transpose:

$$\begin{aligned} h_g'^* &= (H^*H)^{-1}h_g \\ (g^TH')^* &= (H^*H)^{-1}(g^TH)^* \\ H'^*g &= (H^*H)^{-1}H^*g \\ H'^* &= (H^*H)^{-1}H^* \\ H' &= \left[(H^*H)^{-1}H^*\right]^*. \end{aligned} \tag{19}$$

Figure 21:
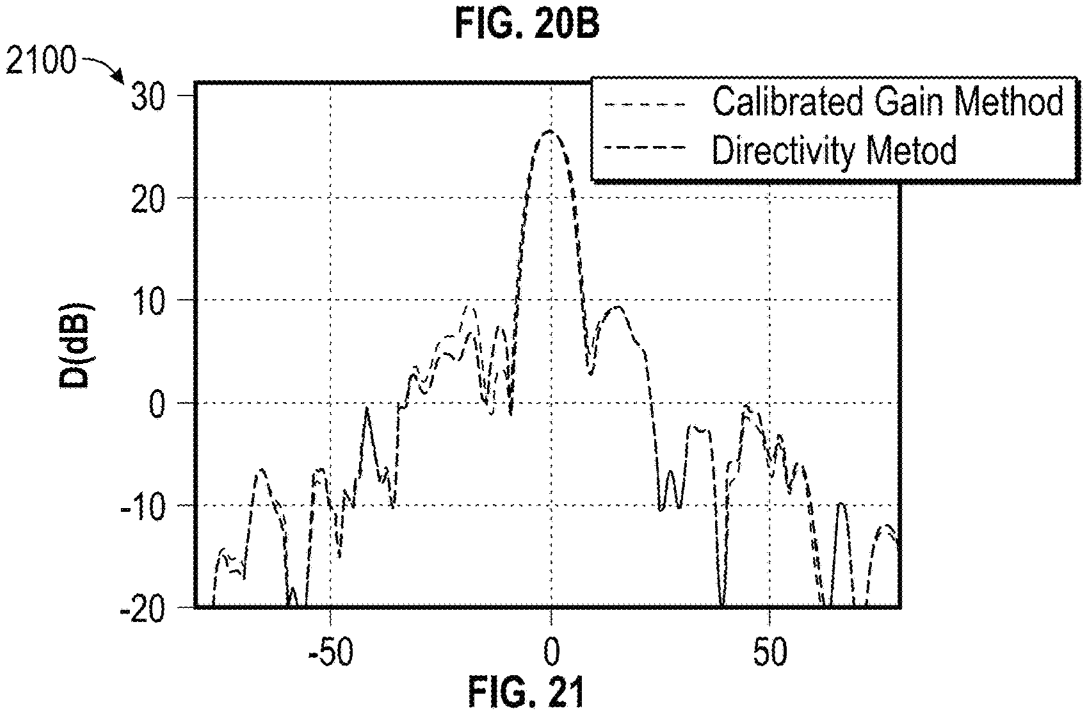
FIG. 21 illustrates theoretical synthesized beams using a calibrated gain solver in accordance with embodiments of the present disclosure.

By making this substitution, we ensure that, regardless of power imbalance between the channels, we will identify weights that maximize beam quality. Moreover, this calibrated gain metric can even be used for PSO. In fact, the gain method with this substitution is equivalent to a version of the directivity method using a look-up table to speed up execution (i.e., pre-compute $(H^*H)^{-1}$). FIG. 21 shows a comparison of 5-feed-synthesized 0° beams using the calibrated gain and directivity methods. The weights given by the calibrated gain method are: $0.64e^{j93°}$, $0.79e^{j-117°}$, $1e^{j0°}$, $0.97e^{j30°}$, $0.41e^{j-141°}$. The weights given by the directivity method are $0.59e^{j}81°$, $0.86e^{j-128°}$, $1e^{j0°}$, $0.92e^{j27°}$, $0.40e^{j-149°}$. Thus, the calibrated gain is effectively equivalent to the directivity method, with error likely due to numerical error from matrix inversion. All measurements involving the gain method in the following sections implement this calibrated gain method. FIG. 21 shows theoretical synthesized beams using the calibrated gain solver and the directivity solver show substantial agreement, confirming the suitability of the proposed directivity solver. Five beams are used to synthesize the target beam at θ=0°.

Figure 22A:
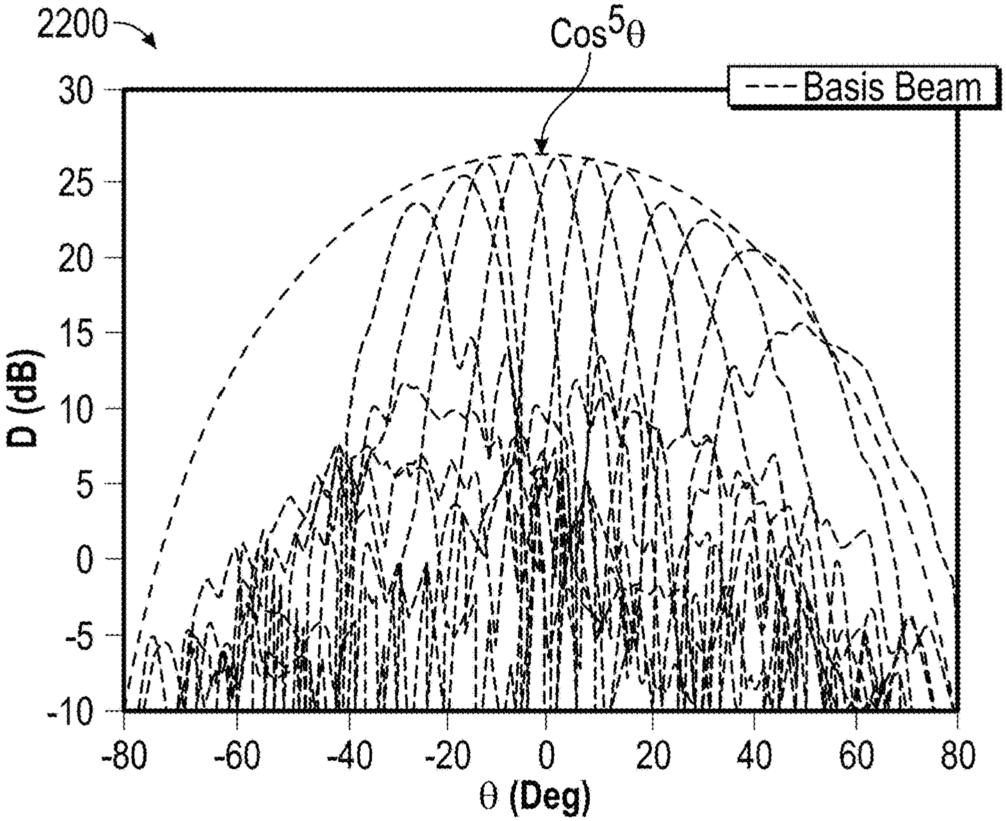
FIGS. 22A and 22B illustrate measured beam results in accordance with embodiments of the present disclosure.
Figure 22B:
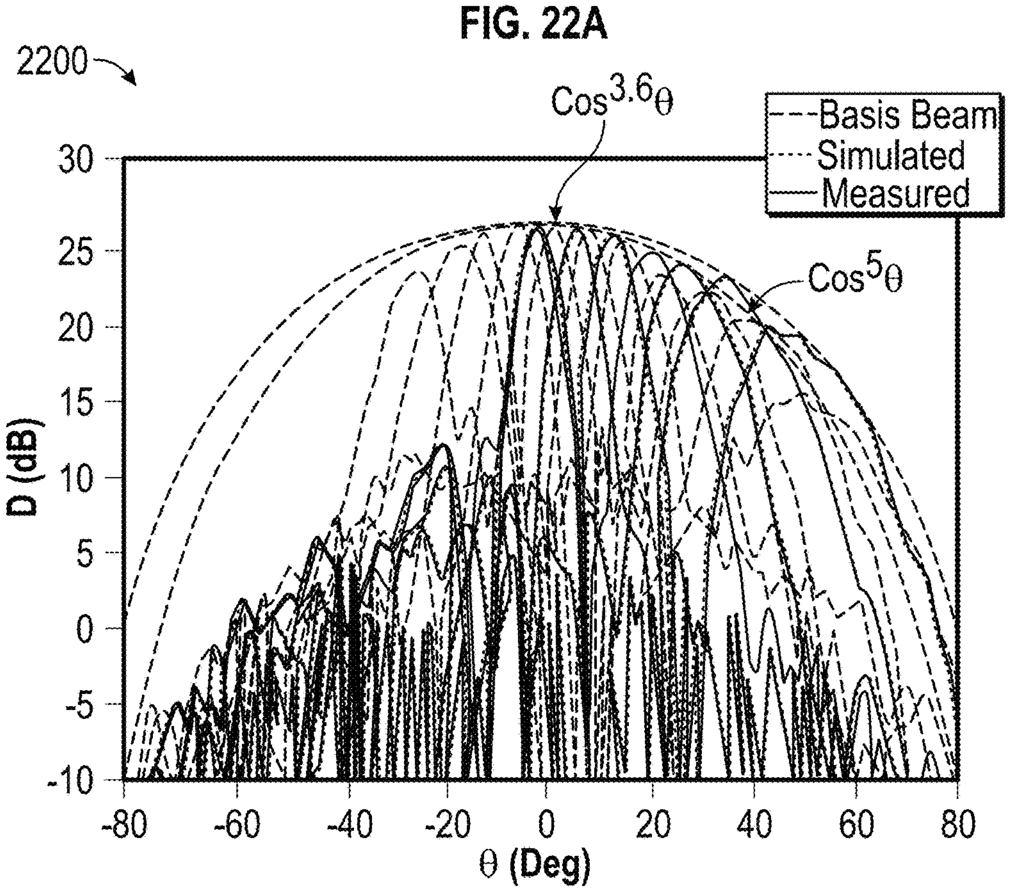

To demonstrate measured null-filling, due to the finite fabricated array length, we are not able to use all possible basis for synthesis and must choose an array position for each measurement as shown in FIG. 20B. The measured basis beams are shown on FIG. 22A with a ±55° scan range. Note that although the 4-inch lens was initially designed for a 10 dBi horn antenna as the feeding element, these horns are impractical as array elements due to large aperture size. As a result, the patch-fed basis beams are degraded from the horn simulations, especially at the edge of the lens due to radiation spillover. Using the calibrated maximum gain method beams were synthesized in the nulls between basis beams, as in FIGS. 14D-F, and the results are shown in FIG. 22B.

The synthesized beams at 0°, 7.6°, 14.2° and 21.6° are synthesized with the array in position I and the beams at 28.4°, 37.6° and 50° are synthesized with the array in position II (FIG. 20B). All measured beams are in good agreement with the corresponding simulated beams. The synthesized beam at 0° achieves directivity of 26.65 dB in simulation and 26.5 dB in measurement, nearly as high as the two neighboring basis beams with directivities of 26.67 dB and 26.62 dB. In general, as with FIG. 14E, we are able to synthesize beams with directivity commensurate with the basis beams at near broadside. Moreover, synthesized beams exhibit a greatly improved scan loss (from $\cos^5(\theta)$ to $\cos^{3.6}(\theta)$).

The theory developed applies in general for any SPAFL system regardless of the type of lens (e.g., Luneburg, QCTO Luneburg, or flat lenses) or how it is fed (e.g., on the Petzval surface or with planar feeds). One of the benefits of the proposed method is that it results in optimal gain for a given S-PAFL realization without requiring a detailed investigation into loss mechanisms. For example, an intuitive approach to improving gain and beam quality for far-out scan angles is to explicitly address spillover and phase center displacement by including feed correction lenses (FCLs) which shift the feed phase centers up, closer to the Petzval surface, and reduce spillover by squinting feed patterns toward the center of the lens.

Figure 23A:
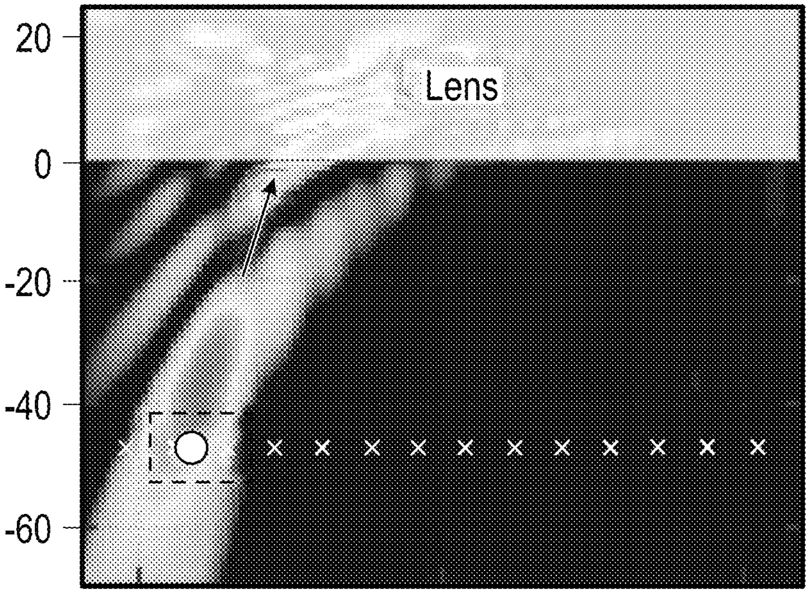
FIGS. 23A and 23B illustrate heat maps in accordance with embodiments of the present disclosure.
Figure 23B:
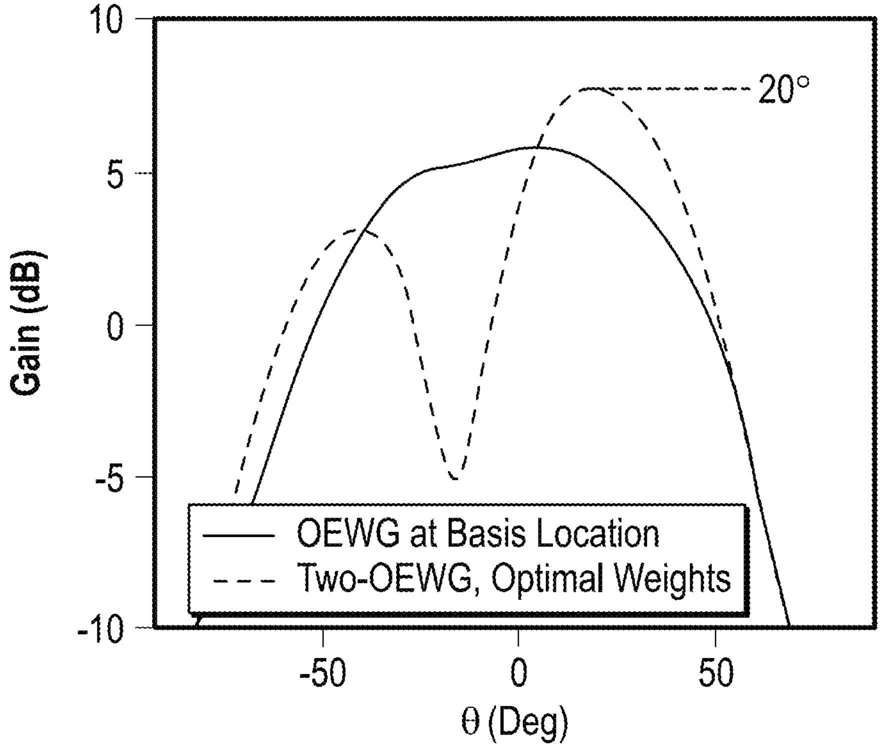

Also investigated was the effective phase center and radiation pattern of the feed array with optimal complex weights applied to observe whether the above-mentioned intuition is the dominant correction mechanism for achieving maximum gain or not. First the feed weights which produce maximum gain at 40° are computed for the OEWG from above. Then the phase center for each feed element (white X's) and the effective phase center of the feed beam with complex weights (white dot) are computed using Empire XPU's builtin phase center solver and shown in FIG. 23A. These have been overlaid with the near-fields resulting from a 40° planewave incident upon the lens. The phase center for optimal feed weights is approximately aligned with the focal spot of the incident wave along the horizontal axis but not in the vertical axis. Furthermore, the feed pattern with optimal weights (red trace in FIG. 23B) is not just a simple squinting of the beam toward the lens center. Instead, there is a main beam squinted toward the lens center along with a second pronounced beam at another angle (presumably coupling into higher order focal points of the near-field). Taken together this indicates that there are loss mechanisms other than displacement from the Petzval surface and spillover loss. This demonstration underscores the value of a closed form, optimal means of computing feed weights. A purely intuitive approach may succeed in improving gain but will likely never result in maximum gain.

The objective of the S-PAFL may be to provide the majority of the functionality expected of a phased array at reduced cost and a fraction of the power. Demonstrated herein is how the proposed system may realize the following functions for current (5G and LEO satcom) and future (e.g., 6G and beyond) wireless millimeter-wave beam-scanning systems: formation of beams at arbitrary angles (beyond the basis beams), which has already been demonstrated; greater control of beam shape, especially sidelobe level; multibeam operation, especially for make-before-break; and broad-beam synthesis for e.g., beam search. The S-PAFL provides at least the last three capabilities. Beams are synthesized using basis beams in FIG. 22A.

Figure 24A:
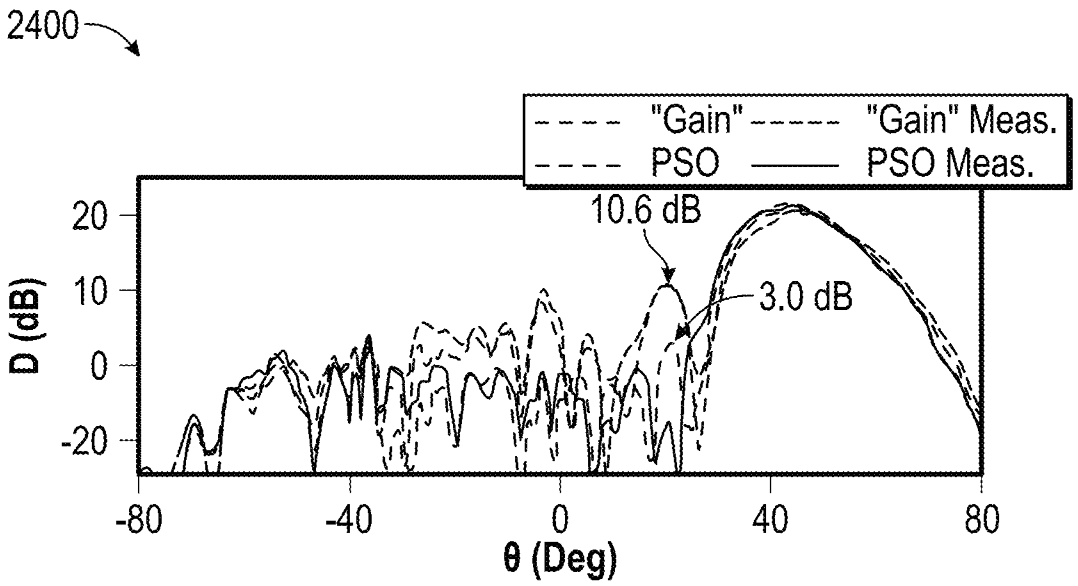
FIGS. 24A and 24B illustrate beam shaping examples in accordance with embodiments of the present disclosure.
Figure 24B:
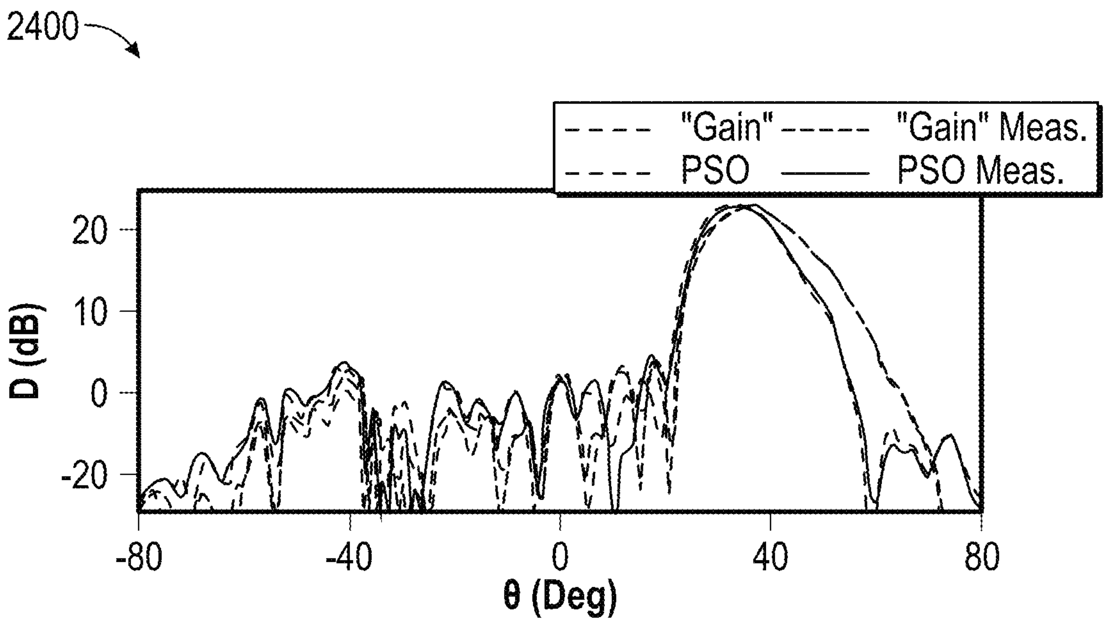

Improved beam shape can be achieved by taking advantage of the PSO algorithm's greater degrees of freedom, especially as the target beam angle increases. In FIGS. 24A and 24B, two examples are shown to demonstrate beams optimized specifically for SLL and beamwidth (BW), with active feeds consisting of the optimal six as chosen via a brute force selection method. The brute force method uses the PSO optimization for all possible combinations of six active feeds and selects the feeds for which the resulting synthesized beam has the maximum FoM. Due to the differences in the component FoM functionals V(Hs), because each $L_i$ was set to be equal for each $f_i$, some component FoMs accrue significantly more or less error for the same empirical difference in beam quality, and thus the weights were empirically tuned to accentuate particular beam features. The first example in FIG. 24A uses a relatively high $w_{SLL}$. The beam is targeted at θ=50°, and the realized PSO beam SLL is at least 10.6 dB better than beams synthesized using the gain method. FIG. 24B shows a θ=37° beam synthesized with a high www. The realized beam is 2.6° narrower at its 6 dB point and 4.2° narrower at its 10 dB point than that synthesized using the calibrated gain method. FIGS. 24A and 24B specifically show beam shaping examples focusing on (a) SLL and (b) beamwidth (BW). Dashed lines denote simulated results and solid lines denote measured results. In (a), the target angle is 50° and the PSO beam exhibits −7.6 dB better SLL than the gain method. In (b), the target angle is at 37° and the PSO beam has a 2.6° narrower 6-dB beamwidth and a 4.2° narrower 10-dB beamwidth than the gain method, while only losing 0.2 dB in directivity.

Figure 25A:
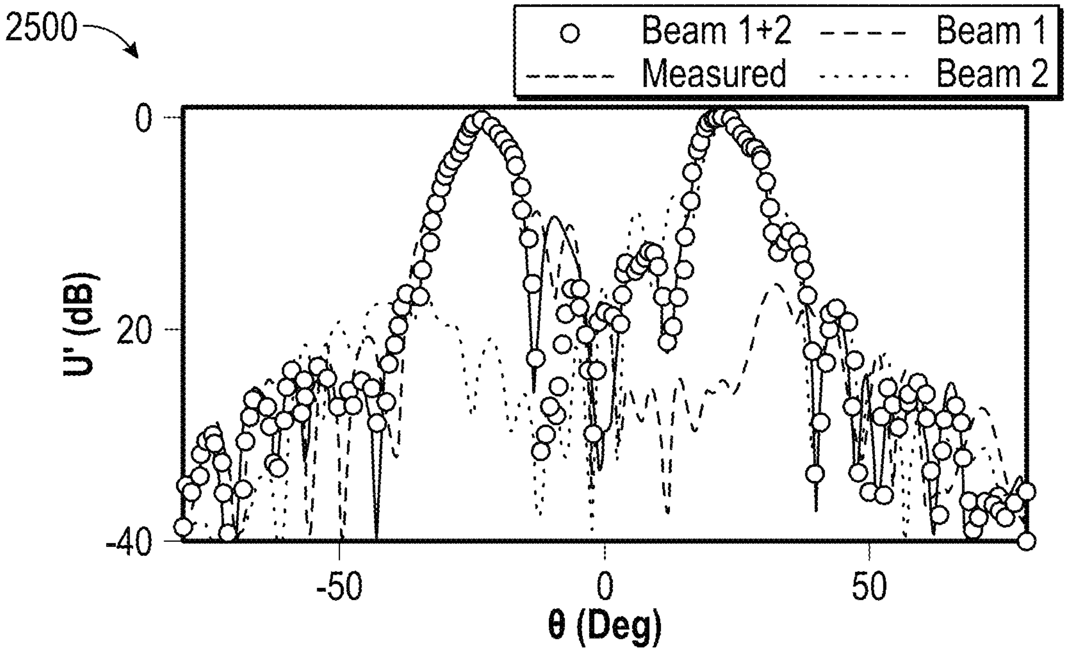
FIGS. 25A and 25B illustrate synthesize beam patterns in accordance with embodiments of the present disclosure.
Figure 25B:
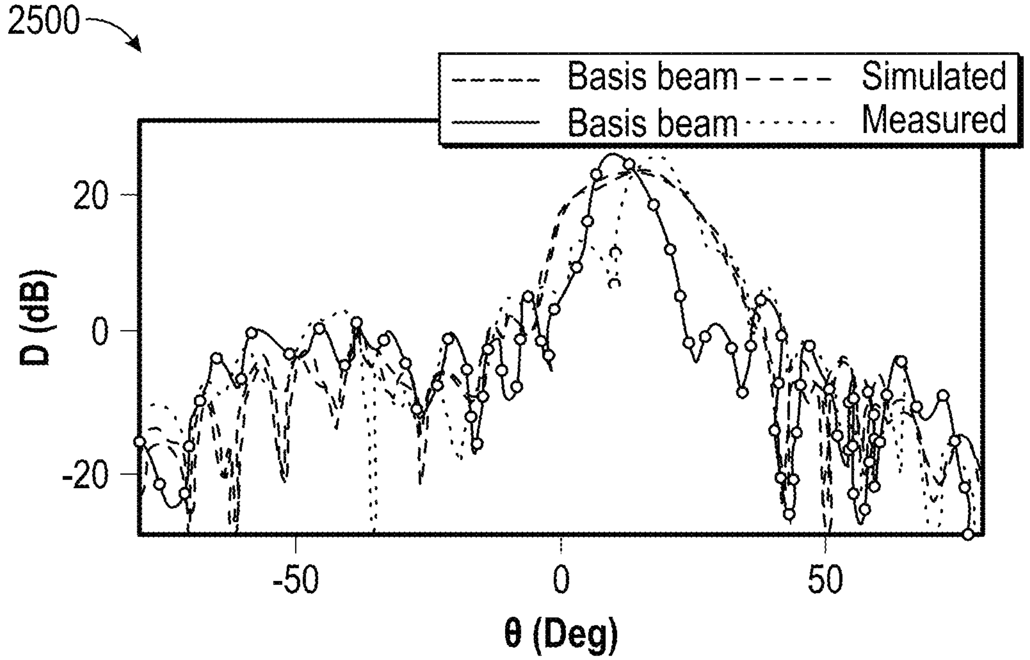

As neither algorithms can directly synthesize multiple beams, relied on herein is superposition, reasoning that two narrow beams with a sufficient angular separation should minimally interact. Two beams are initially synthesized separately using 3 feeds at −23° (using patches 1-3) and 23° (using patches 6-8), near the measured basis nulls at −20.3° and 21.6°. Then the two sets of weights are normalized for equal power in each beam and the beams are excited simultaneously. FIGS. 25A and 25B show the resulting multibeam pattern, and compares this pattern with the original −23° and 23° beams. The result shows good agreement between simulation and measurement, and the main lobes of the originally synthesized beams are not much changed by the simultaneous beam excitation. This is due to the directional element patterns and the correspondingly low number of active feeds necessary for a given beam. FIG. 25A specifically shows a synthesized pattern has beams at both −23° and 23°. The relatively large angular separation for this multibeam pattern minimally affects the beam shape for each single beam but lowers the directivity (as more total power is radiated). Normalized intensity is plotted to give a fair comparison between the desired and measured beam patterns. FIG. 25B shows a synthesized beam with a wide 3 dB beam width of 17.6°. The closest two beams only realize 7.7° (cross marker) and 8.7° (dot marker) of 3 dB beam width.

One strategy to reduce network latency in multiantenna systems may be to employ an iterative search using progressively narrower beams during channel characterization. Again, since these algorithms are designed for high-gain pencil beams, we resort to a heuristic approach to beamforming. FIG. 25B shows a synthesized 17.6° 3 dB-beamwidth beam at 13.6°, using in-phase excitation of patches 5-8 in array position I. Two basis beams are plotted for comparison, with 3 dB beamwidths of 7.7° and 8.7°.

The embodiments described herein therefore show that, for a given lens and sparse feed array, there is a set of complex weights which can achieve smooth (and maximum) gain for all angles in the FoV—this eliminates gain-droop across the FoV, improves scan loss (by up to 4 dB in the prototype system), and all with a very small number (e.g., 5) of active feeds. The results were applied to a prototype system and also to several simulated systems employing state-of-the-art lenses in the literature with similar results. In various embodiments, a method for rapidly and simply calibrating deployed systems is also described herein. In addition, a multi-objective optimizer (based upon PSO) is described herein to control beam-shape (e.g., sidelobe level, coma lobes, beamwdith). The result is that an S-PAFL system which uses the proposed algorithms can be considered a general beamforming antenna which is able to use many fewer elements than an equivalent phased-array and consuming a small fraction of the power.

While the desired properties of a lens which is well-suited for an S-PAFL system is beyond the scope of this work, there are several relevant observations. Firstly, in general it was observed that the S-PAFL system with the maximum gain method improves scan loss exponents up to $n \rightarrow (n-2)$. However, if the basis beams exhibit lower scan loss exponents without optimal complex weighting there will exist less tension between maximum gain and beamquality. In this case, the beam synthesized with the maximum gain method and the beam synthesised with PSO to achieve e.g., narrow beamwidth would largely agree. This is unlike the beams observed in FIGS. 24A and 24B where, in order to achieve a high-quality beam shape (narrower beamwidth) at far-out scan angles, the PSO method sacrificed gain—this is largely because the lenses used in this validation of the methods and systems herein were not explicitly designed for wide angle scanning but instead for low overall volume (flat lenses) and simplified feed geometry (flat feed plane). As such other embodiments contemplated herein may use a more ideal beam-scanning lens (e.g., a Luneberg Lens), the joint optimization of low beamwidth and maximum gain at far-out scan angles would likely be in better agreement with the maximum gain method. Therefore, there may be a tradespace between lens formfactor (e.g., spherical Luneberg lenses versus flat lenses) and beamscan which can in any case be improved with complex feed excitation (see FIG. 12C). In addition to using a lens which is well-suited to the S-PAFL architecture, a lens may be used that reduces complexity (and therefore cost) while maintaining beamscan performance. As has been shown, the methods herein may greatly improve the performance of lenses with relatively poor beamscan performance and therefore if, S-PAFL algorithms were used with an explicitly simplified lens geometry, the result could a be a very low-cost, low scanloss S-PAFL system.

Another advantage of the embodiments described herein is that, due to the sparse feed elements, one may simplify feed-array design. For example, with more space for each feed element alternative (e.g., wideband) antennas may be considered which may not fit in a 0.5λ grid. Element-to-element coupling is also reduced which may solve issues related to scan blindness. In addition, since scan angle is realized largely with the aperture lens and not exclusively with phase shifters in the feed array, wideband beamscanning may be realized without true time delay units. Or, given the fewer number of feed elements and the significant reduction in active feed elements, full digital beamforming architectures may be used due to a reduced number of ADCs and lower-complexity baseband processing. Another possibility is to grade the feed spacing to reduce cost/complexity. As was shown, null-filling is ultimately governed by gain crossover of the basis beams and therefore wider basis beams allow for wider spacing of feed elements. Since, for planar aperture antennas, beams broaden as scan angle increases it may be possible to use wider-spaced feeds at the edge of the feed array to reduce the number of elements.

For each of the above tradeoffs, a joint optimization is used in which a lens is designed and evaluated for the maximum possible gain over scan for that given lens realization. The proposed numerically efficient methods for computing maximum gain as well as the "loudest neighbor" heuristic are critical to lens/feed-array joint optimization. Taken together the methods described herein allow for the rapid calculation of maximum gain versus scan angle for a candidate S-PAFL system.

Although certain example methods, apparatuses, and computer readable media have been described herein, the scope of coverage of this patent is not limited thereto. On the contrary, this patent covers all methods, apparatus, computer readable media, and articles of manufacture fairly falling within the scope of the appended claims either literally or under the doctrine of equivalents.

Figure 26:
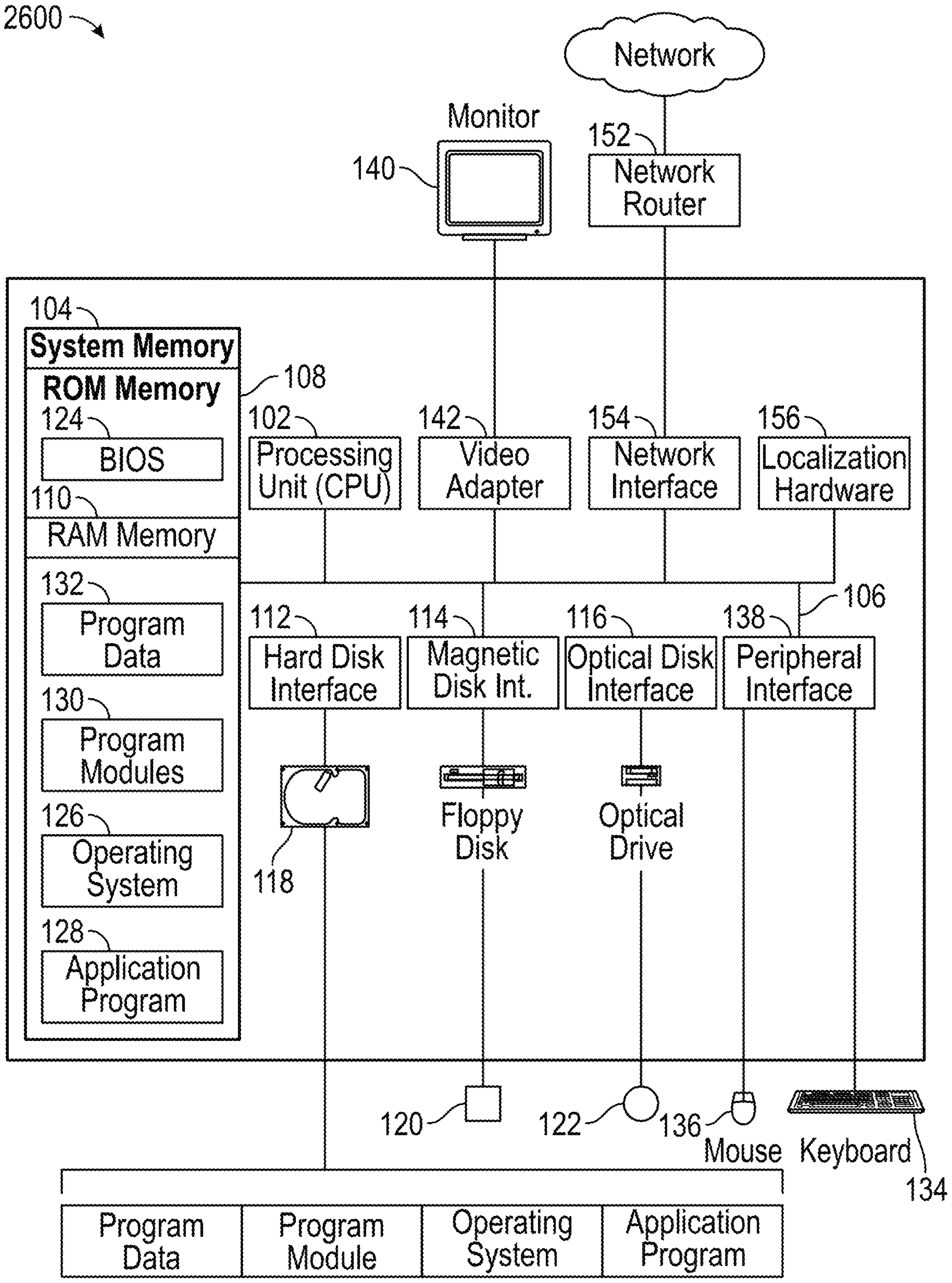
FIG. 26 is a diagrammatic view of an example embodiment of a computing environment in accordance with embodiments of the present disclosure.

FIG. 26 is a diagrammatic view of an example embodiment of a computing environment that includes a general-purpose computing system environment 100, such as a desktop computer, laptop, smartphone, tablet, or any other such device having the ability to execute instructions, such as those stored within a non-transient, computer-readable medium. Any of the methods or systems described herein may be implemented on or executed by instructions stored upon a computing device that has any combination of the components shown in and described with respect to FIG. 26. For example, a controller or processor of a computing device may generate signals for transmission through the S-PAFL systems described herein and/or may receive and process signals that are received through the S-PAFL systems described herein. Similarly, computing devices may include instructions stored on memory and executable by a processor to carry out any of the methods for using an S-PAFL described herein.

Furthermore, while described and illustrated in the context of a single computing system 100, those skilled in the art will also appreciate that the various tasks described herein may be practiced in a distributed environment having multiple computing systems 100 linked via a local or wide-area network in which the executable instructions may be associated with and/or executed by one or more of multiple computing systems 100.

In its most basic configuration, computing system environment 100 typically includes at least one processing unit 102 and at least one memory 104, which may be linked via a bus 106. Depending on the exact configuration and type of computing system environment, memory 104 may be volatile (such as RAM 110), non-volatile (such as ROM 108, flash memory, etc.) or some combination of the two. Computing system environment 100 may have additional features and/or functionality. For example, computing system environment 100 may also include additional storage (removable and/or non-removable) including, but not limited to, magnetic or optical disks, tape drives and/or flash drives. Such additional memory devices may be made accessible to the computing system environment 100 by means of, for example, a hard disk drive interface 112, a magnetic disk drive interface 114, and/or an optical disk drive interface 116. As will be understood, these devices, which would be linked to the system bus 306, respectively, allow for reading from and writing to a hard disk 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system environment 100. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 100.

A number of program modules may be stored in one or more of the memory/media devices. For example, a basic input/output system (BIOS) 124, containing the basic routines that help to transfer information between elements within the computing system environment 100, such as during start-up, may be stored in ROM 108. Similarly, RAM 110, hard drive 118, and/or peripheral memory devices may be used to store computer executable instructions comprising an operating system 126, one or more applications programs 128 (which may include the functionality disclosed herein, for example), other program modules 130, and/or program data 122. Still further, computer-executable instructions may be downloaded to the computing environment 100 as needed, for example, via a network connection.

An end-user may enter commands and information into the computing system environment 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processor 102 via interfaces such as, for example, a parallel port, game port, firewire, or a universal serial bus (USB). To view information from the computing system environment 100, a monitor 140 or other type of display device may also be connected to bus 106 via an interface, such as via video adapter 132. In addition to the monitor 140, the computing system environment 100 may also include other peripheral output devices, not shown, such as speakers and printers.

The computing system environment 100 may also utilize logical connections to one or more computing system environments. Communications between the computing system environment 100 and the remote computing system environment may be exchanged via a further processing device, such a network router 152, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system environment 100, or portions thereof, may be stored in the memory storage device(s) of the computing system environment 100.

The computing system environment 100 may also include localization hardware 186 for determining a location of the computing system environment 100. In embodiments, the localization hardware 156 may include, for example only, a GPS antenna, an RFID chip or reader, a WiFi antenna, or other computing hardware that may be used to capture or transmit signals that may be used to determine the location of the computing system environment 100.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as “determining” or “outputting” or “transmitting” or “recording” or “locating” or “storing” or “displaying” or “receiving” or “recognizing” or “utilizing” or “generating” or “providing” or “accessing” or “checking” or “notifying” or “delivering” or the like, refer to the action and processes of a computer system, or similar electronic computing device, that manipulates and transforms data. The data is represented as physical (electronic) quantities within the computer system’s registers and memories and is transformed into other data similarly represented as physical quantities within the computer system memories or registers, or other such information storage, transmission, or display devices as described herein or otherwise understood to one of ordinary skill in the art.

What is claimed is:

1. An electromagnetic antenna comprising:

a first and second feed element adjacent to each other and configured to simultaneously radiate a first and second signal, the first signal having a first frequency, a first amplitude and a first phase, the second signal having a second frequency, a second amplitude and a second phrase referenced to the phase of the first signal, wherein:

the first frequency is equal to the second frequency;

the first amplitude is equal to or larger than the second amplitude by between a factor of −10 dB and 10 dB;

the first phase is different from the second phase by a predetermined angle between 0 and 360 degrees; and the first and second feed elements being spaced apart by a predetermined distance between 0.5λ and 1λ, wherein λ is a wavelength of an operating frequency;

a printed circuit board (PCB) comprising a multi-channel beamforming circuit configured to supply the first and second signals, where the multi-channel beamforming circuit is further configured to transform a third signal into the first and second signal;

a focal surface on which the first and second feed elements are mounted; and an electromagnetic lens configured to focus the first and second signals for transmission and/or reception.

2. The electromagnetic antenna of claim 1, wherein the electromagnetic lens comprises a compound lens having first and second lens elements arranged in series, wherein the compound lens focuses both the first and second signals and is associated with the first and second feed elements.

3. The electromagnetic antenna of claim 2, wherein the first lens element provides greater focusing than the second lens element, and further wherein the second lens element squints the first and second signals in aggregate toward the first lens.

4. The electromagnetic antenna of claim 3, wherein each of the first and second lens elements comprises a gradient index (GRIN) lens.

5. The electromagnetic antenna of claim 1, wherein the electromagnetic lens comprises at least a first lens element and a second lens element arranged in parallel to one another, wherein:

the first lens element focuses the first signal and is associated with the first feed element, and the second lens element focuses the second signal and is associated with the second feed element.

6. The electromagnetic antenna of claim 1, wherein λ is in a range between 3.75 mm and 37.5 mm.

7. The electromagnetic antenna of claim 1, wherein the predetermined distance between 0.6λ and 1λ.

8. The electromagnetic antenna of claim 1, wherein the predetermined distance between 0.7λ and 1λ.

9. The electromagnetic antenna of claim 1, wherein the predetermined distance between 0.75λ and 1λ.

10. The electromagnetic antenna of claim 1, wherein the predetermined distance between 0.6λ and 0.8λ.

11. The electromagnetic antenna of claim 1, further comprising a third feed element adjacent to the second feed element, wherein the second feed element and the third feed element are spaced apart by the predetermined distance.

12. The electromagnetic antenna of claim 11, further comprising a fourth feed element adjacent to the third feed element, wherein the third feed element and the fourth feed element are spaced apart by the predetermined distance.

13. The electromagnetic antenna of claim 12, wherein the multi-channel beamforming circuit is configured to select more than one of, but not all of, the first feed element, the second feed element, the third feed element, or the fourth feed element to supply signals for output or input by the electromagnetic antenna.

14. The electromagnetic antenna of claim 12, wherein the electromagnetic lens comprises a first electromagnetic lens associated with the first and second feed elements and a second electromagnetic lens associated with the third and fourth feed elements.

15. The electromagnetic antenna of claim 1, wherein the first and second signals, while being simultaneously radiated from the first and second feed elements, respectively, are configured to constructively interfere with one another to create a steered beam signal.

16. The electromagnetic antenna of claim 1, wherein the first and second feed elements are configured to generate a fourth signal and a fifth signal in response to receiving a steered beam signal, respectively.

17. The electromagnetic antenna of claim 16, wherein the multi-channel beamforming circuit is further configured to generate a sixth signal by combining the fourth and fifth signals generated by the first and second feed elements.

18. The electromagnetic antenna of claim 17, wherein the fourth signal and the fifth signal are each representative of aspects of the steered beam signal received at the electromagnetic antenna.

19. The electromagnetic antenna of claim 16, wherein the steered beam signal passes through the electromagnetic lens prior to being received at the first and second feed elements.

20. The electromagnetic antenna of claim 19, wherein the electromagnetic lens comprises a plurality of lenses, and wherein the steered beam signal passes through the plurality of lenses prior to being received at the first and second feed elements.

21. The electromagnetic antenna of claim 1, wherein the focal surface comprises a planar focal surface.

22. The electromagnetic antenna of claim 1, wherein the focal surface comprises a non-planar focal surface.

23. The electromagnetic antenna of claim 1, wherein λ is in a range between 3.75 mm and 15 mm.

* * * * *